(12) United States Patent
Takeyasu

(10) Patent No.: US 11,116,053 B2
(45) Date of Patent: Sep. 7, 2021

(54) LIGHTING CONTROL DEVICE, LIGHTING CONTROL METHOD, AND COMPUTER READABLE MEDIUM

(71) Applicant: MITSUBISHI ELECTRIC CORPORATION, Tokyo (JP)

(72) Inventor: Masaaki Takeyasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 101 days.

(21) Appl. No.: 16/486,256

(22) PCT Filed: Apr. 6, 2017

(86) PCT No.: PCT/JP2017/014338
§ 371 (c)(1),
(2) Date: Aug. 15, 2019

(87) PCT Pub. No.: WO2018/185900
PCT Pub. Date: Oct. 11, 2018

(65) Prior Publication Data
US 2020/0196407 A1 Jun. 18, 2020

(51) Int. Cl.
*H05B 45/18* (2020.01)
*H05B 47/10* (2020.01)
(Continued)

(52) U.S. Cl.
CPC .............. *H05B 45/18* (2020.01); *B60Q 1/14* (2013.01); *H05B 45/12* (2020.01); *H05B 45/325* (2020.01); *H05B 47/10* (2020.01)

(58) Field of Classification Search
CPC ...... H05B 45/10; H05B 45/325; H05B 47/10; H05B 45/48; H05B 45/12; H05B 45/18; B60Q 1/14; B60Q 1/0088; B60Q 1/08
See application file for complete search history.

(56) References Cited

U.S. PATENT DOCUMENTS 6,166,496 A 12/2000 Lys et al.
6,211,626 B1 4/2001 Lys et al.
(Continued)

FOREIGN PATENT DOCUMENTS

JP 2008-34385 A 2/2008
JP 2010-40495 A 2/2010
(Continued)

OTHER PUBLICATIONS

International Search Report, issued in PCT/JP2017/014338, PCT/ISA/210, dated Jun. 27, 2017.
(Continued)

*Primary Examiner* — Borna Alaeddini
(74) *Attorney, Agent, or Firm* — Birch, Stewart, Kolasch & Birch, LLP

(57) ABSTRACT

A headlamp lighting device (100) is mounted on a vehicle. The headlamp lighting device (100) stores definition information in which a plurality of lamp devices arranged on the vehicle are presented and, for each of the lamp devices, one or more light sources configuring the lamp device and a control value for controlling each of the light sources are presented. Also, for each of the lamp devices, the headlamp lighting device (100) controls lighting of each of the light sources configuring the lamp device by referring to the definition information.

13 Claims, 38 Drawing Sheets

(51) Int. Cl.
*H05B 45/325* (2020.01)
*B60Q 1/14* (2006.01)
*H05B 45/12* (2020.01)

(56) References Cited

U.S. PATENT DOCUMENTS

| | | | |
|---|---|---|---|
| 6,292,901 B1 | 9/2001 | Lys et al. | |
| 6,459,919 B1 | 10/2002 | Lys et al. | |
| 6,528,954 B1 | 3/2003 | Lys et al. | |
| 7,038,398 B1 | 5/2006 | Lys et al. | |
| 7,332,877 B2 * | 2/2008 | Crodian | B60Q 3/80 315/297 |
| 9,900,957 B2 * | 2/2018 | van de Ven | F21V 29/74 |
| 10,583,831 B2 * | 3/2020 | Schmudderich | G08G 1/166 |
| 10,624,185 B2 * | 4/2020 | Esfahani | H05B 47/19 |
| 2001/0028227 A1 | 10/2001 | Lys et al. | |
| 2013/0169155 A1 * | 7/2013 | Nakashima | B60Q 1/14 315/82 |
| 2016/0377251 A1 * | 12/2016 | Kim | B60Q 1/14 362/466 |
| 2017/0120801 A1 * | 5/2017 | Asaoka | G06K 9/00791 |
| 2019/0239325 A1 * | 8/2019 | Esfahani | H05B 45/20 |
| 2020/0236745 A1 * | 7/2020 | Garrett | B60Q 1/52 |

FOREIGN PATENT DOCUMENTS

| | | |
|---|---|---|
| JP | 2013-26024 A | 2/2013 |
| JP | 2013-84635 A | 5/2013 |
| JP | 2013-107590 A | 6/2013 |
| JP | 2014-94666 A | 5/2014 |
| JP | 2016-185717 A | 10/2016 |
| JP | 2016-188004 A | 11/2016 |
| JP | 2016-203863 A | 12/2016 |
| WO | WO 99/10867 A1 | 3/1999 |

OTHER PUBLICATIONS

Office Action issued in Japanese Patent Application No. 2017-549346 dated Jan. 16, 2018.
U.S. Appl. No. 60/068,792, filed Dec. 24, 1997.
U.S. Appl. No. 60/071,281, filed Dec. 17, 1997.
U.S. Appl. No. 60/078,861, filed Mar. 20, 1998.
U.S. Appl. No. 60/079,285, filed Mar. 25, 1998.
U.S. Appl. No. 60/090,920, filed Jun. 26, 1998.

* cited by examiner

Fig. 8

EXAMPLE OF DEFINITION INFORMATION (CONNECTION INFORMATION)

DEFINITION INFORMATION (CONNECTION INFORMATION) OF FIRST CONTROL DEVICE

| NUMBER OF SECOND CONTROL DEVICE | CONNECTED/ DISCONNECTED | LIGHT SOURCE NUMBER | CONNECTED/ DISCONNECTED | LAMP DEVICE TYPE |
|---|---|---|---|---|
| 1 | CONNECTED | 1 | CONNECTED | LOW BEAM |
|  |  | 2 | CONNECTED | LOW BEAM |
|  |  | 3 | DISCONNECTED | — |
|  |  | 4 | CONNECTED | POSITION LAMP |
| 2 | CONNECTED | 1 | CONNECTED | ADB1 |
|  |  | 2 | CONNECTED | ADB1 |
|  |  | .. | .. |  |
| .. | .. | .. |  |  |
| 25 | DISCONNECTED | 1 | DISCONNECTED |  |
|  |  | .. | .. |  |
|  |  | 4 | DISCONNECTED |  |

Fig. 9

EXAMPLE OF DEFINITION INFORMATION (LIGHTING PATTERN INFORMATION)

DEFINITION INFORMATION (LIGHTING PATTERN INFORMATION) OF FIRST CONTROL DEVICE

| LAMP DEVICE TYPE | SCENE | LIGHT SOURCE NUMBER | LUMINANCE VALUE (%) | | | | |
|---|---|---|---|---|---|---|---|
| | | | 1 | 2 | 3 | ... | |
| LOW BEAM | SUNNY | 1 | 90 | 90 | 90 | ... | 50 |
| | | 2 | 90 | 90 | 90 | ... | 90 |
| BLINKER | HAZARD LIGHT | 1 | 100 | 100 | 100 | ... | 90 |
| | | 2 | 100 | 100 | 100 | ... | 100 |
| | | 3 | 100 | 100 | 100 | ... | 100 |
| | | 4 | 100 | 100 | 100 | ... | 100 |
| | DIRECTIONAL INDICATOR | 1 | 20 | 40 | 80 | ... | 100 |
| | | 2 | 0 | 20 | 40 | ... | 100 |
| | | 3 | 0 | 0 | 20 | ... | 100 |
| | | 4 | 0 | 0 | 0 | ... | 100 |

Fig. 10

EXAMPLE OF DEFINITION INFORMATION
(LIGHT SOURCE CONTROL INFORMATION)

DEFINITION INFORMATION (LIGHT SOURCE CONTROL INFORMATION)
OF SECOND CONTROL DEVICE

| LIGHT SOURCE NUMBER | CONNECTED/ DISCONNECTED | SUPPLY CURRENT VALUE |
|---|---|---|
| 1 | CONNECTED | 1000mA |
| 2 | CONNECTED | 1000mA |
| 3 | DISCONNECTED | — |
| 4 | CONNECTED | 300mA |

Fig. 14

EXAMPLE OF DEFINITION INFORMATION (LIGHTING PATTERN INFORMATION) WITH COMBINATION OF MAP DATA AND MASK PATTERNS

| LAMP DEVICE TYPE | SCENE | LIGHTING PATTERN |
|---|---|---|
| BLINKER | DIRECTIONAL INDICATOR | MAP DATA (1) |
|  | HAZARD LIGHT | MAP DATA (2) |
|  | WELCOME LIGHT | ((MAP DATA (1) ) AND (NOT (MASK PATTERN (1) ) ) OR ( (MAP DATA (2) ) AND ( (MASK PATTERN (2) ) ) |

Fig. 15

EXAMPLE OF MAP DATA

| MAP DATA | LIGHT SOURCE NUMBER | 0 | 1 | 2 | 3 | 4 | 5 | 6 | 7 | 8 | 9 | 10 |
|---|---|---|---|---|---|---|---|---|---|---|---|---|
| MAP DATA (1) | 1 | 0 | 100 | 100 | 100 | 100 | 100 | 0 | 0 | 0 | 0 | 0 |
| | 2 | 0 | 0 | 100 | 100 | 100 | 100 | 0 | 0 | 0 | 0 | 0 |
| | 3 | 0 | 0 | 0 | 100 | 100 | 100 | 0 | 0 | 0 | 0 | 0 |
| | 4 | 0 | 0 | 0 | 0 | 100 | 100 | 0 | 0 | 0 | 0 | 0 |
| MAP DATA (2) | 1 | 0 | 100 | 100 | 100 | 100 | 100 | 0 | 0 | 0 | 0 | 0 |
| | 2 | 0 | 100 | 100 | 100 | 100 | 100 | 0 | 0 | 0 | 0 | 0 |
| | 3 | 0 | 100 | 100 | 100 | 100 | 100 | 0 | 0 | 0 | 0 | 0 |
| | 4 | 0 | 100 | 100 | 100 | 100 | 100 | 0 | 0 | 0 | 0 | 0 |

LUMINANCE VALUE (%)

Fig. 16

EXAMPLE OF MASK PATTERNS

| MASK PATTERN | LIGHT SOURCE NUMBER | MASK VALUE | | | | | | | | | | |
|---|---|---|---|---|---|---|---|---|---|---|---|---|
| | | 0 | 1 | 2 | 3 | 4 | 5 | 6 | 7 | 8 | 9 | 10 |
| MASK PATTERN (1) | 1 | 0 | 0 | 0 | 0 | 0 | 0 | 0 | 0 | 0 | 0 | 0 |
| | 2 | 0 | 0 | 0 | 0 | 0 | 0 | 0 | 0 | 0 | 0 | 0 |
| | 3 | 0 | 0 | 0 | 1 | 1 | 0 | 0 | 0 | 0 | 0 | 0 |
| | 4 | 0 | 0 | 0 | 1 | 1 | 0 | 0 | 0 | 0 | 0 | 0 |
| MASK PATTERN (2) | 1 | 0 | 1 | 1 | 1 | 1 | 1 | 1 | 1 | 1 | 1 | 1 |
| | 2 | 0 | 0 | 1 | 0 | 1 | 1 | 1 | 1 | 1 | 1 | 1 |
| | 3 | 0 | 0 | 0 | 0 | 0 | 1 | 1 | 1 | 1 | 1 | 1 |
| | 4 | 0 | 0 | 0 | 0 | 0 | 1 | 1 | 1 | 1 | 1 | 1 |

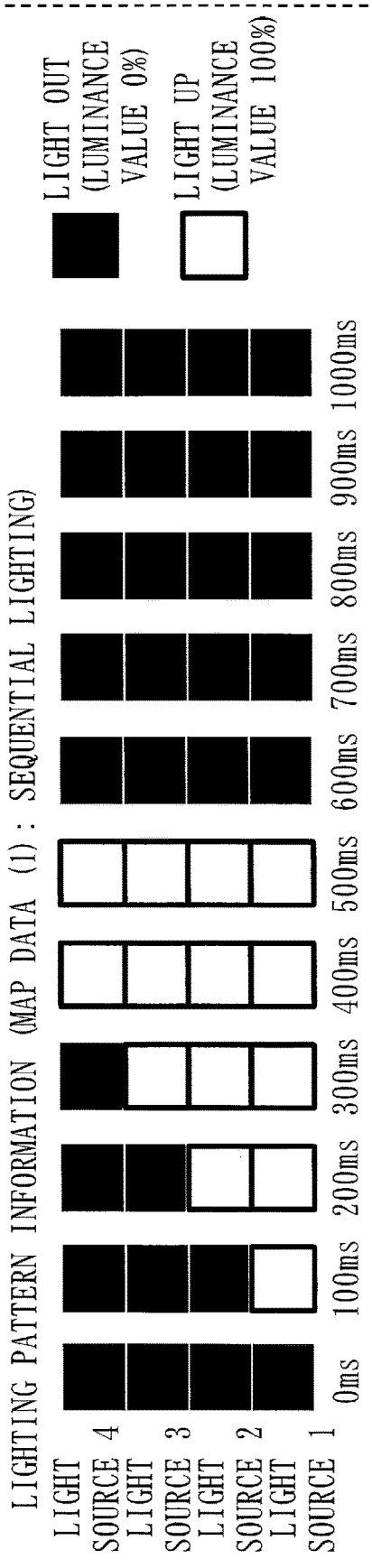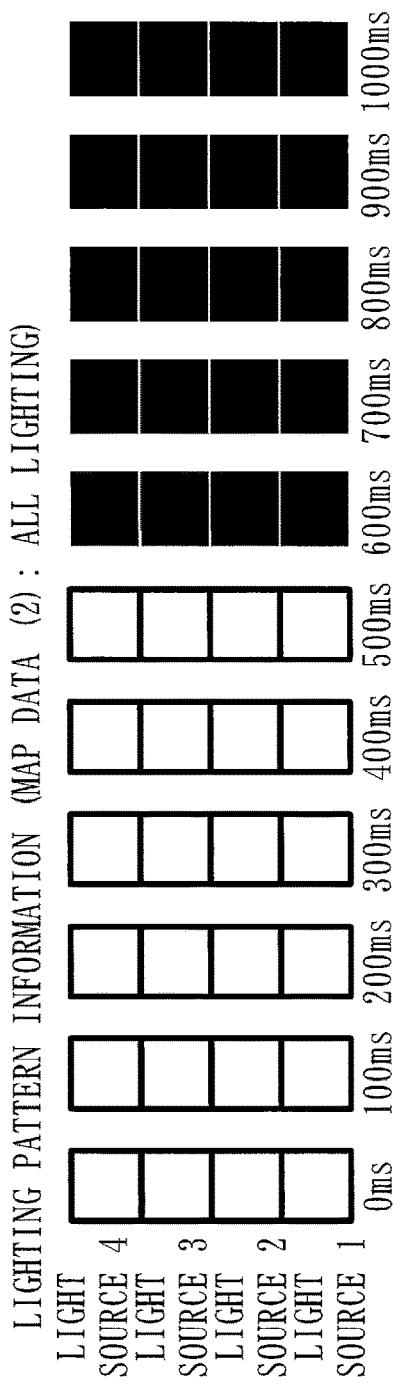
Fig. 17

Fig. 19

EXAMPLE OF DEFINITION INFORMATION (LIGHTING PATTERN INFORMATION)

(a) LIGHTING PATTERN FOR EACH STAGE

| LAMP DEVICE TYPE | SCENE | STAGE | LIGHTING PATTERN | NUMBER OF TIMES |
|---|---|---|---|---|
| BLINKER | DIRECTIONAL INDICATOR | SCENE START STAGE | MAP DATA (1) | ONCE |
| | | SCENE HALFWAY STAGE | MAP DATA (2) | INFINITY |
| | | SCENE END STAGE | MAP DATA (3) | ONCE |

(b) MAP DATA FOR EACH STAGE

| MAP DATA | LIGHT SOURCE NUMBER | LUMINANCE VALUE (%) | | | | | | | | | | |
|---|---|---|---|---|---|---|---|---|---|---|---|---|
| | | 0 | 1 | 2 | 3 | 4 | 5 | 6 | 7 | 8 | 9 | 10 |
| MAP DATA (1) | 1 | 0 | 100 | 100 | 100 | 100 | 100 | — | — | — | — | — |
| | 2 | 0 | 0 | 100 | 100 | 100 | 100 | — | — | — | — | — |
| | 3 | 0 | 0 | 0 | 100 | 100 | 100 | — | — | — | — | — |
| | 4 | 0 | 0 | 0 | 0 | 100 | 100 | — | — | — | — | — |
| MAP DATA (2) | 1 | 0 | 100 | 100 | 100 | 100 | 100 | 0 | 0 | 0 | 0 | 0 |
| | 2 | 0 | 100 | 100 | 100 | 100 | 100 | 0 | 0 | 0 | 0 | 0 |
| | 3 | 0 | 100 | 100 | 100 | 100 | 100 | 0 | 0 | 0 | 0 | 0 |
| | 4 | 0 | 100 | 100 | 100 | 100 | 100 | 0 | 0 | 0 | 0 | 0 |
| MAP DATA (3) | 1 | 100 | 0 | 0 | 0 | 0 | 0 | — | — | — | — | — |
| | 2 | 100 | 100 | 0 | 0 | 0 | 0 | — | — | — | — | — |
| | 3 | 100 | 100 | 100 | 0 | 0 | 0 | — | — | — | — | — |
| | 4 | 100 | 100 | 100 | 100 | 0 | 0 | — | — | — | — | — |

Fig. 22

EXAMPLE OF DEFINITION INFORMATION (LIGHT SOURCE CHARACTERISTIC INFORMATION)

DEFINITION INFORMATION (LIGHT SOURCE CHARACTERISTIC INFORMATION) OF SECOND CONTROL DEVICE (a)

| LIGHT SOURCE TYPE | REFERENCE CURRENT VALUE | TEMPERATURE (°C) | LIGHT SOURCE RANK | LUMINOSITY (mcd) |
|---|---|---|---|---|
| 1 | 20 | 25 | A | 800 |
|   |   |    | B | 600 |
|   |   | 50 | A | 700 |
|   |   |    | B | 500 |
| 2 | 40 | 25 | A | 1600 |
|   |   |    | B | 1200 |
|   |   | 50 | A | 1400 |
|   |   |    | B | 1000 |

(b)

| LIGHT SOURCE TYPE | RANK OF LIGHT SOURCE | LIGHT SOURCE CURRENT VALUE (mA) ±5% |
|---|---|---|
| 1 | A | 970 |
|   | B | 860 |
| ⋮ |   |   |

(c)

| LIGHT SOURCE TYPE | ALLOWABLE CURRENT VALUE RANGE (mA) | TARGET LUMINOSITY (mcd) |
|---|---|---|
| 1 | 700~1000 | 3000 |
| 2 | 300~600 | 1000 |
| ⋮ |   | ⋮ |

Fig. 23

EXAMPLE OF DEFINITION INFORMATION
(LAMP DEVICE CHARACTERISTIC INFORMATION)

DEFINITION INFORMATION (LAMP DEVICE CHARACTERISTIC INFORMATION)
OF SECOND CONTROL DEVICE

| CURRENT VALUE (mA) | VOLTAGE VALUE (V) | |
|---|---|---|
| | LOW BEAM | POSITION LAMP |
| 0 | 0 | 0 |
| 100 | 2.8 | 1.9 |
| 200 | 2.9 | 2 |
| 300 | 3.0 | 2.1 |

Fig. 27

EXAMPLE OF DEFINITION INFORMATION (CONNECTION INFORMATION)

DEFINITION INFORMATION (CONNECTION INFORMATION) OF FIRST CONTROL DEVICE

| NUMBER OF SECOND CONTROL DEVICE | CONNECTED/ DISCONNECTED | SUPPLY CURRENT VALUE | LIGHT SOURCE NUMBER | CONNECTED/ DISCONNECTED | LAMP DEVICE TYPE |
|---|---|---|---|---|---|
| 1 | CONNECTED | 1000mA | 1 | CONNECTED | LOW BEAM |
| | | | 2 | CONNECTED | LOW BEAM |
| | | | 3 | DISCONNECTED | — |
| | | | 4 | CONNECTED | POSITION LAMP |
| 2 | CONNECTED | 1000mA | 1 | CONNECTED | ADB1 |
| | | | 2 | CONNECTED | ADB1 |
| .. | .. | | .. | .. | |
| 25 | DISCONNECTED | — | 1 | DISCONNECTED | |
| | | | .. | .. | |
| | | | 4 | DISCONNECTED | |

Fig.28

EXAMPLE OF DEFINITION INFORMATION (LIGHTING PATTERN INFORMATION)

DEFINITION INFORMATION (LIGHTING PATTERN INFORMATION) OF FIRST CONTROL DEVICE

| LAMP DEVICE TYPE | SCENE | LIGHT SOURCE NUMBER | LUMINANCE VALUE (%) | | | | |
|---|---|---|---|---|---|---|---|
| | | | 1 | 2 | 3 | ... | |
| LOW BEAM | SUNNY | 1 | 90 | 90 | 90 | ... | 50 |
| | | 2 | 90 | 90 | 90 | ... | 90 |
| BLINKER | HAZARD LIGHT | 1 | 100 | 100 | 100 | ... | 90 |
| | | 2 | 100 | 100 | 100 | ... | 100 |
| | | 3 | 100 | 100 | 100 | ... | 100 |
| | | 4 | 100 | 100 | 100 | ... | 100 |
| | DIRECTIONAL INDICATOR | 1 | 20 | 40 | 80 | ... | 100 |
| | | 2 | 0 | 20 | 40 | ... | 100 |
| | | 3 | 0 | 0 | 20 | ... | 100 |
| | | 4 | 0 | 0 | 0 | ... | 100 |

Fig.29

EXAMPLE OF DEFINITION INFORMATION
(LIGHT SOURCE CONTROL INFORMATION)

DEFINITION INFORMATION
(LIGHT SOURCE CONTROL INFORMATION) OF SECOND CONTROL DEVICE

| LIGHT SOURCE NUMBER | CONNECTED/DISCONNECTED | DUTY RATIO |
|---|---|---|
| 1 | CONNECTED | 100% |
| 2 | CONNECTED | 100% |
| 3 | DISCONNECTED | — |
| 4 | CONNECTED | 30% |

Fig. 34

LUMINANCE VALUE DETERMINATION METHOD <DETAILS OF S103
(LUMINANCE VALUE DETERMINATION METHOD. METHOD FOR FINDING LUMINANCE VALUE (1))>

REFERENCE: LIGHTING PATTERN DEFINITION

| MAP DATA | LIGHT SOURCE NUMBER | LUMINANCE VALUE (%) PER 100 ms | | |
|---|---|---|---|---|
| | | 1 | 2 | 3 |
| MAP DATA (1) | 1 | 100 | 100 | 100 |
| | 2 | 0 | 100 | 100 |
| | 3 | 0 | 0 | 100 |
| | 4 | 0 | 0 | 0 |
| MAP DATA (2) | 1 | 100 | 100 | 100 |
| | 2 | 100 | 100 | 100 |
| | 3 | 100 | 100 | 100 |
| | 4 | 100 | 100 | 100 |

Time (n)   Time (n+1)

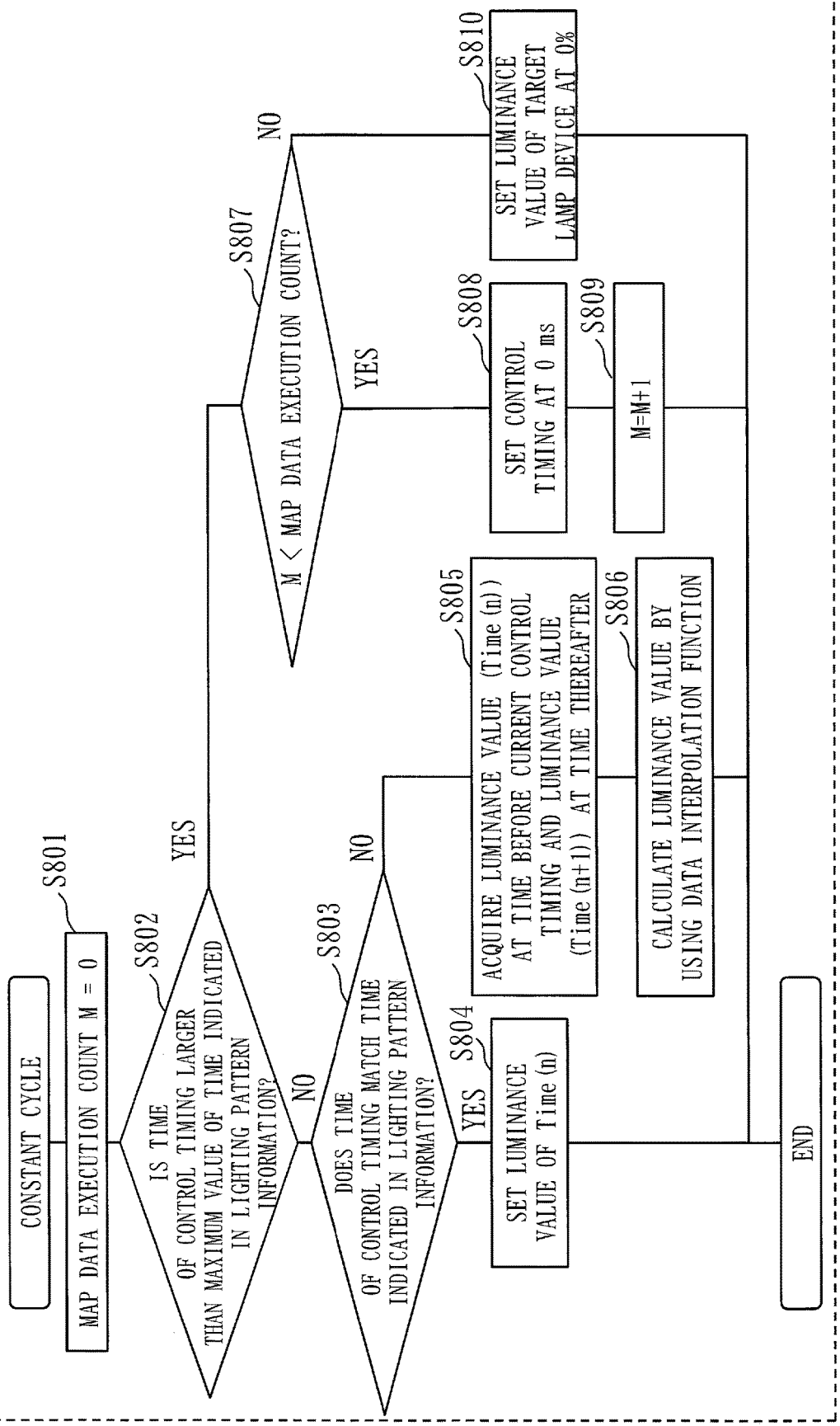

LIGHTING CONTROL DEVICE, LIGHTING CONTROL METHOD, AND COMPUTER READABLE MEDIUM

TECHNICAL FIELD

The present invention relates to control of a headlamp of a vehicle.

BACKGROUND ART

Conventionally, a headlamp of a vehicle has been controlled with a fixed light distribution pattern in which only light-up or light-out of a lamp device included in the headlamp is specified. The lamp device is a low-beam lamp (hereinafter simply referred to as a low beam), high-beam lamp (hereinafter simply referred to as a high beam), position lamp, blinker, or the like included in the headlamp.

In recent years, such as ADB (Adaptive Driving Beam), a technique of forming various light distribution patterns has been developed. ADB is a technique in which, while a vehicle is traveling with its high beam lit up, when an on-vehicle camera detects a forward vehicle such as a preceding vehicle or opposing vehicle, an area where the forward vehicle is positioned is light-shielded and the other area is irradiated with a high beam. In ADB, for example, a plurality of LED (Light Emitting Diode) light sources are used, and the luminance of each LED light source can be individually adjusted. In ADB, control is performed in which an LED light source irradiating the area where the forward vehicle is positioned is lit out or dimmed.

As a method of adjusting the luminance of the LED light source, a method of controlling a current value flowing through the LED element or a method of performing PWM (Pulse Width Modulation) control on a current value flowing through the LED element can be used. A conventional LED lighting device adjusts the luminance for each LED light source by performing PWM control for each LED element on the current value flowing therethrough.

In Patent Literature 1, another method of adjusting the luminance of LED elements is disclosed.

In Patent Literature 1, switch elements are connected in parallel with a plurality of LED elements connected in series. And, a constant current is supplied from a constant current source to the series-parallel circuit of the LED elements and the switch elements, thereby controlling ON/OFF of the switch elements. By ON/OFF of the switch elements, the luminance of the LED elements is adjusted.

CITATION LIST

Patent Literature

Patent Literature 1: JP 2013-84635 A

SUMMARY OF INVENTION

Technical Problem

In the headlamp of the vehicle, the specification of the lamp device varies depending on the vehicle type, the destination of the vehicle, or the like. For example, the number of light sources configuring a lamp device varies. Moreover, depending on the type of light source, control values such as a supply current value or PWM control value may vary.

The technique of Patent Literature 1 has a problem in which, to support the difference in the specification of the lamp device, a mechanism for controlling lighting of the lamp device has to be individually developed for each specification.

The present invention mainly aims at solving this problem. Specifically, the present invention mainly aims at acquiring a structure capable of controlling various lamp devices by absorbing specification differences among the lamp devices.

Solution to Problem

A lighting control device to be mounted on a vehicle, according to the present invention, includes:

a storage unit to store definition information in which a plurality of lamp devices arranged on the vehicle are presented and, for each of the lamp devices, one or more light sources configuring the lamp device and a control value for controlling each of the light sources are presented; and a control unit to control, for each of the lamp devices, lighting of each of the light sources configuring the lamp device by referring to the definition information.

Advantageous Effects of Invention

According to the present invention, by changing the definition information in accordance with the specification of the lamp device arranged on the vehicle, specification differences among the lamp devices can be absorbed, and various lamp devices can be controlled.

BRIEF DESCRIPTION OF DRAWINGS

FIG. 8 illustrates an example of definition information (connection information) according to Embodiment 1.

FIG. 9 illustrates an example of definition information (lighting pattern information) according to Embodiment 1.

FIG. 10 illustrates an example of definition information (light source control information) according to Embodiment 1.

FIG. 14 illustrates an example of definition information with combination of map data and mask patterns according to Embodiment 1.

FIG. 15 illustrates an example of the map data according to Embodiment 1.

FIG. 16 illustrates an example of the mask patterns according to Embodiment 1.

FIG. 17 illustrates a lighting example of map data (1) and a lighting example of map data (2) according to Embodiment 1.

FIG. 19 illustrates an example of the definition information (lighting pattern information) according to Embodiment 1.

FIG. 22 illustrates an example of definition information (light source characteristic information) according to Embodiment 1.

FIG. 23 illustrates an example of definition information (lamp device characteristic information) according to Embodiment 1.

FIG. 27 illustrates an example of definition information (connection information) according to Embodiment 2.

FIG. 28 illustrates an example of definition information (lighting pattern information) according to Embodiment 2.

FIG. 29 illustrates an example of definition information (light source control information) according to Embodiment 2.

FIG. 34 illustrates map data definitions according to Embodiment 1.

FIG. 38 is a flowchart illustrating the luminance value determination method according to Embodiment 1.

DESCRIPTION OF EMBODIMENTS

Figure 1:
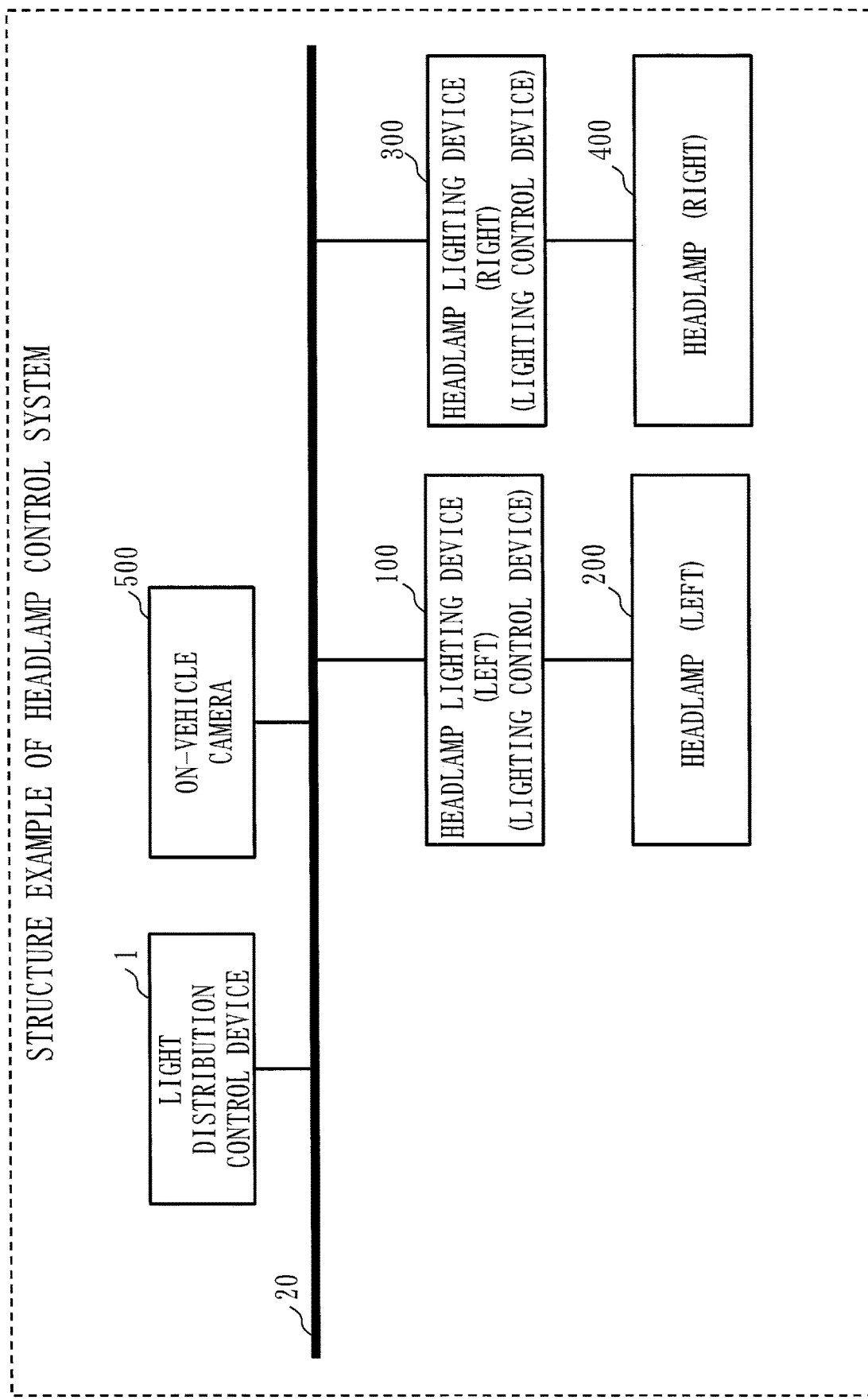
FIG. 1 illustrates a structure example of a headlamp control system according to Embodiment 1.

In the following, embodiments of the present invention are described by using the drawings. In the following description of the embodiments and the drawings, those provided with a same reference character indicate a same portion or corresponding portion.

Embodiment 1

*Description of Structure*

FIG. 1 illustrates a structure example of a headlamp control system according to Embodiment 1.

The headlamp control system includes a light distribution control device 1, a headlamp lighting device 100, a headlamp lighting device 300, a headlamp 200, a headlamp 400, and an on-vehicle camera 500.

The light distribution control device 1, the headlamp lighting device 100, the headlamp lighting device 300, the headlamp 200, the headlamp 400, and the on-vehicle camera 500 are mounted on a vehicle.

The light distribution control device 1, the headlamp lighting device 100, the headlamp lighting device 300, the headlamp 200, the headlamp 400, and the on-vehicle camera 500 are connected to a network 20.

The headlamp 200 is arranged on the left side of the vehicle, applying light to the left side of the vehicle.

The headlamp 400 is arranged on the right side of the vehicle, applying light to the right side of the vehicle.

The headlamp 200 and the headlamp 400 each include a plurality of lamp devices. The lamp devices are, as described above, for example, a low beam, high beam, ADB, position lamp, blinker, and so forth.

Also, each lamp device is configured of one or more light sources. Normally, each lamp device is configured of a plurality of light sources. The light sources are, for example, LEDs.

The light distribution control device 1 notifies the headlamp lighting device 100 of instruction information regarding light-up and light-out of the headlamp 200. Also, the light distribution control device 1 notifies the headlamp lighting device 300 of instruction information regarding light-up and light-out of the headlamp 400.

The light distribution control device 1 generates instruction information based on the operation state of a switch, button, or the like by the driver, the position of a forward vehicle acquired by the on-vehicle camera 500, the position of the vehicle where the light distribution control device 1 is mounted, or the like.

The light distribution control device 1 makes a notification of a current situation (scene) in the instruction information. The current situation (scene) includes a current situation regarding traveling of the vehicle, a current situation regarding a passenger of the vehicle, and a current situation regarding an external environment of the vehicle. The current situation regarding traveling of the vehicle includes a traveling speed, acceleration, traveling position, and so forth of the vehicle. The current situation regarding the passenger of the vehicle includes an operation situation of a switch or button by the passenger of the vehicle, a situation of an input of an instruction by voice or other means by the passenger of the vehicle, and so forth. The current situation regarding the external environment of the vehicle includes weather, brightness (darkness) on the periphery of the vehicle, temperature, moisture, the presence or absence of a forward vehicle, and so forth.

The headlamp lighting device 100 controls lighting of each light source included in the headlamp 200 based on the instruction information received from the light distribution control device 1.

The headlamp lighting device 300 controls lighting of each light source included in the headlamp 400 based on the instruction information received from the light distribution control device 1.

The headlamp lighting device 100 and the headlamp lighting device 300 each correspond to a lighting control device. Also, operations to be performed by the headlamp lighting device 100 and the headlamp lighting device 300 correspond to a lighting control method and a lighting control program.

Note that while the structure and operation of the headlamp lighting device 100 are described in the following, the following description on the headlamp lighting device 100 also applies to the headlamp lighting device 300. That is, the "headlamp lighting device 100" described below can be read as the "headlamp lighting device 300".

Figure 2:
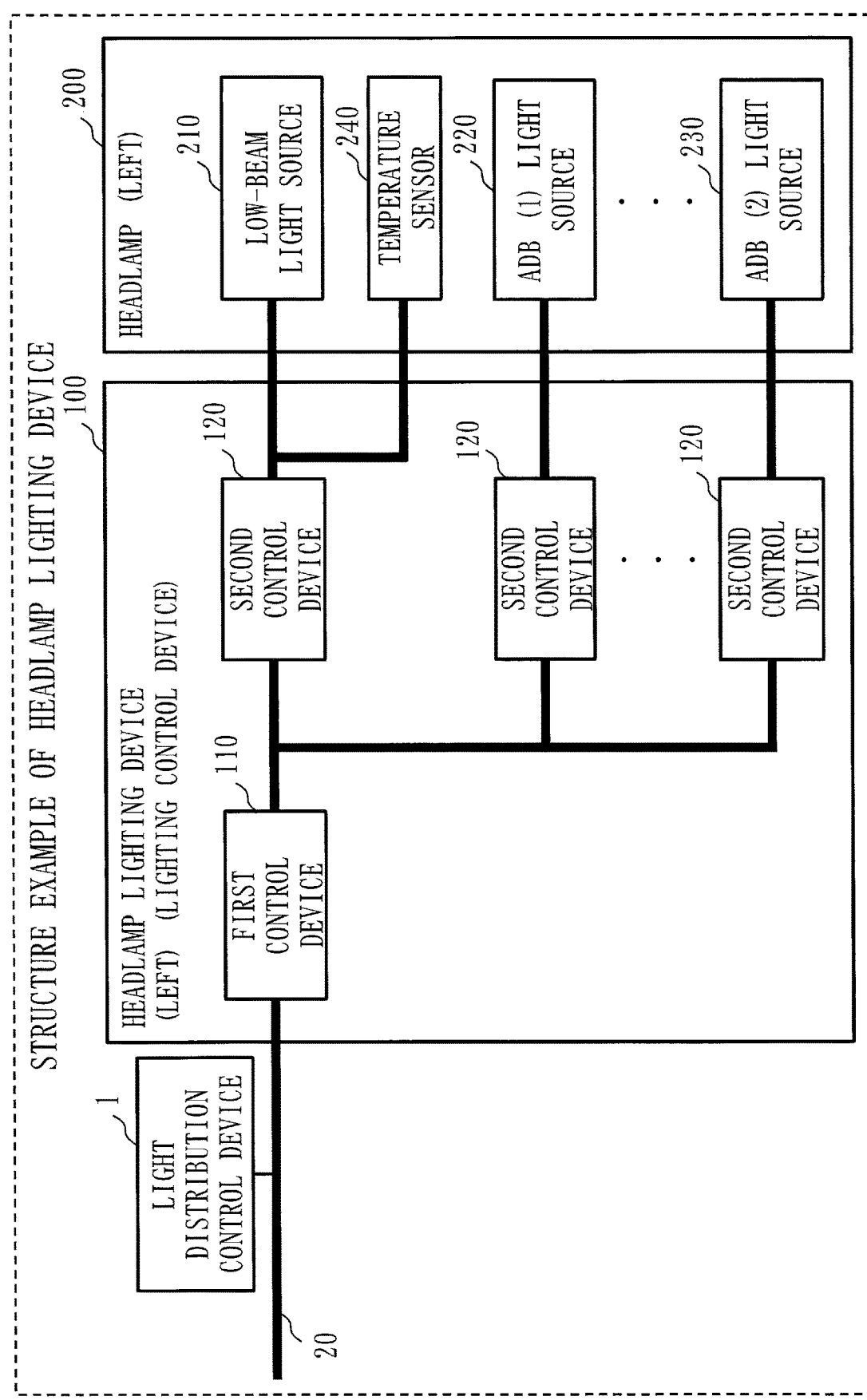
FIG. 2 illustrates a structure example of a headlamp lighting device according to Embodiment 1.

FIG. 2 illustrates a structure example of the headlamp lighting device 100.

The headlamp lighting device 100 is used to apply light illuminating ahead of the vehicle.

The headlamp lighting device 100 has a first control device 110 and a plurality of second control devices 120.

The first control device 110 judges light-up and light-out of each light source.

The second control device 120 adjusts the luminance of each light source.

In the headlamp 200, as described above, the light sources of the plurality of lamp devices are included. In FIG. 2, a low-beam light source 210, an ADB (1) light source 220, and an ADB (2) light source 230 are illustrated. In the headlamp 200, however, light sources of other lamp devices such as a position-lamp light source and a blinker light source are included.

Also, the headlamp 200 includes a plurality of temperature sensors 240. Each temperature sensor 240 measures a temperature on the periphery of each light source.

In the present embodiment, the second control device 120 is provided for each lamp device and is connected to the relevant lamp device.

The first control device 110 receives instruction information from the light distribution control device 1. The instruction information is information for making an instruction of light-up or light-out of a lamp device such as the low beam or high beam. Also, the instruction information is information for making an instruction of light-up or light-out of each zone of an ADB. Also, the instruction information is information for making a notification of a current situation (scene). By following the instruction information, the first control device 110 selects the second control device 120 connected to a lamp device lighting of which is to be controlled, and gives a control signal to the selected second control device 120.

Each of the plurality of second control devices 120 controls light-up or light-out of each light source of the connected lamp device and also controls the luminance of each light source, based on the control signal from the first control device 110. While only three second control devices 120 are illustrated in FIG. 2, the second control devices 120 are present as many as the number of lamp devices included in the headlamp 200. Also, while the second control devices 120 and the lamp devices have a one-to-one correspondence in the present embodiment, one second control device 120 may control a plurality of lamp devices.

Note that while the structures of the headlamp lighting device 100 and the headlamp 200 are illustrated in FIG. 2, the structures of the headlamp lighting device 300 and the headlamp 400 are identical to those illustrated in FIG. 2.

Figure 3:
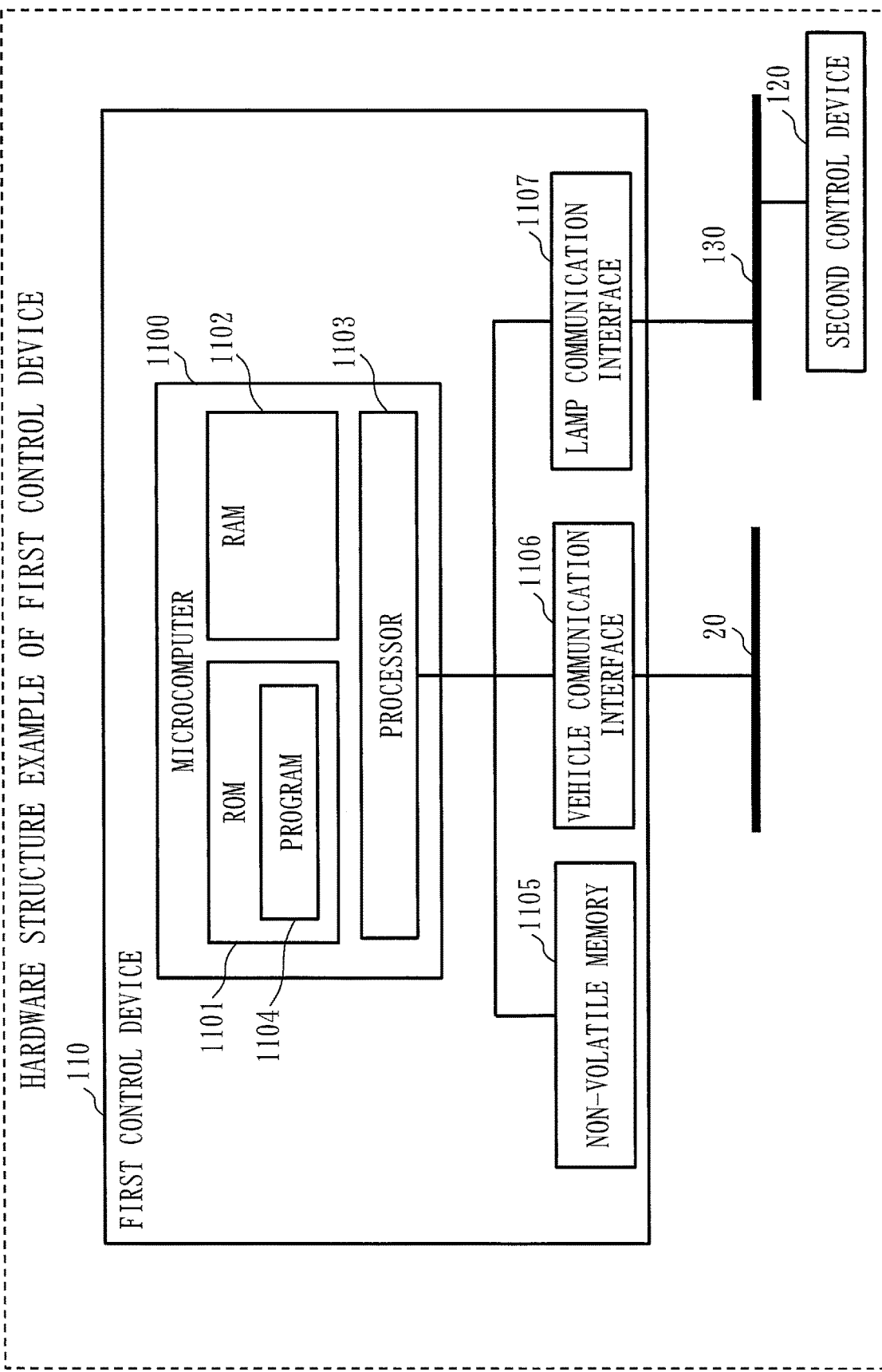
FIG. 3 illustrates a hardware structure example of a first control device according to Embodiment 1.

FIG. 3 illustrates a hardware structure example of the first control device 110.

The first control device 110 is a computer.

The first control device 110 includes a microcomputer 1100, a non-volatile memory 1105, a vehicle communication interface 1106, and a lamp communication interface 1107.

The vehicle communication interface 1106 is an interface with the network 20.

The lamp communication interface 1107 is an interface with a network 130 connected to the second control device 120.

The network 20 and the network 130 are each, for example, a LIN (Local Interconnect Network) or CAN (Controller Area Network) widely used in an on-vehicle network. The network 20 and the network 130 each may be another network.

In the microcomputer 1100, a ROM (Read Only Memory) 1101, a RAM (Random Access Memory) 1102, and a processor 1103 are included.

In the ROM 1101, a program 1104 is stored. The program 1104 is a program implementing the functions of a first control unit 1110 and a vehicle communication unit 1120 and a lamp communication unit 1130, which will be described further below.

The program 1104 is loaded from the ROM 1101 onto the RAM 1102. Then, the processor 1103 reads the program 1104 to execute the program 1104.

With the processor 1103 executing the program 1104, the processor 1103 operates as the first control unit 1110 and the vehicle communication unit 1120 and the lamp communication unit 1130, which will be described further below.

The non-volatile memory 1105 implements a first storage unit 1150, which will be described further below. Also, the ROM 1101 may implement the first storage unit 1150.

Figure 4:
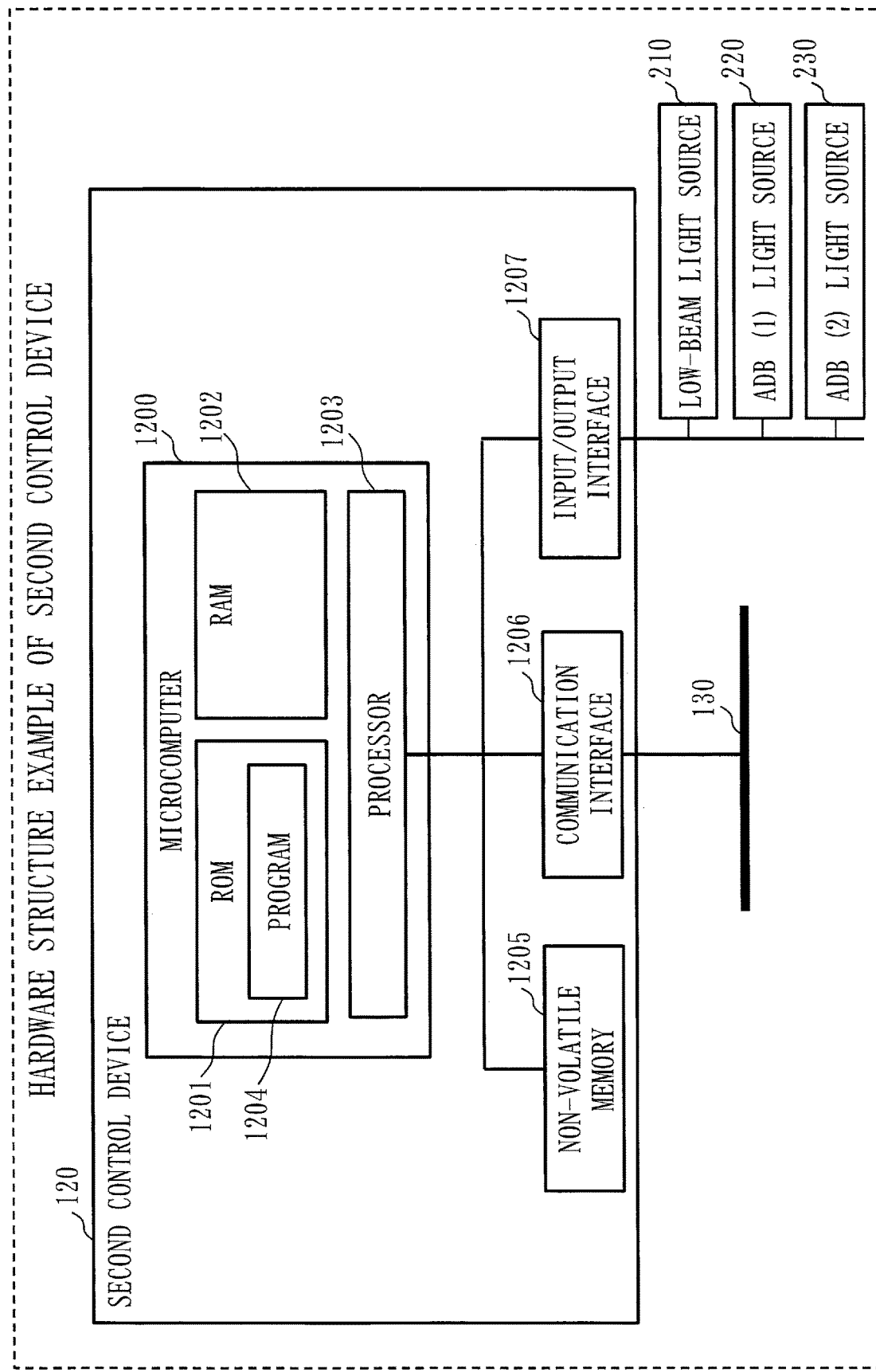
FIG. 4 illustrates a hardware structure example of a second control device according to Embodiment 1.

FIG. 4 illustrates a hardware structure example of the second control device 120.

The second control device 120 is a computer.

The second control device 120 includes a microcomputer 1200, a non-volatile memory 1205, a communication interface 1206, and an input/output interface 1207.

The communication interface 1206 is an interface with the network 130.

The input/output interface 1207 is an interface with the low-beam light source 210, the ADB (1) light source 220, the ADB (2) light source 230, and so forth.

In the microcomputer 1200, a ROM 1201, a RAM 1202, and a processor 1203 are included.

In the ROM 1201, a program 1204 is stored. The program 1204 is a program implementing the functions of a second control unit 1210, a communication unit 1220, and an input/output unit 1230, which will be described further below.

The program 1204 is loaded from the ROM 1201 onto the RAM 1202. Then, the processor 1203 reads the program 1204 to execute the program 1204.

With the processor 1203 executing the program 1204, the processor 1203 operates as the second control unit 1210, the communication unit 1220, and the input/output unit 1230, which will be described further below.

The non-volatile memory 1205 implements a second storage unit 1250, which will be described further below. Also, the ROM 1201 may implement the second storage unit 1250.

Figure 5:
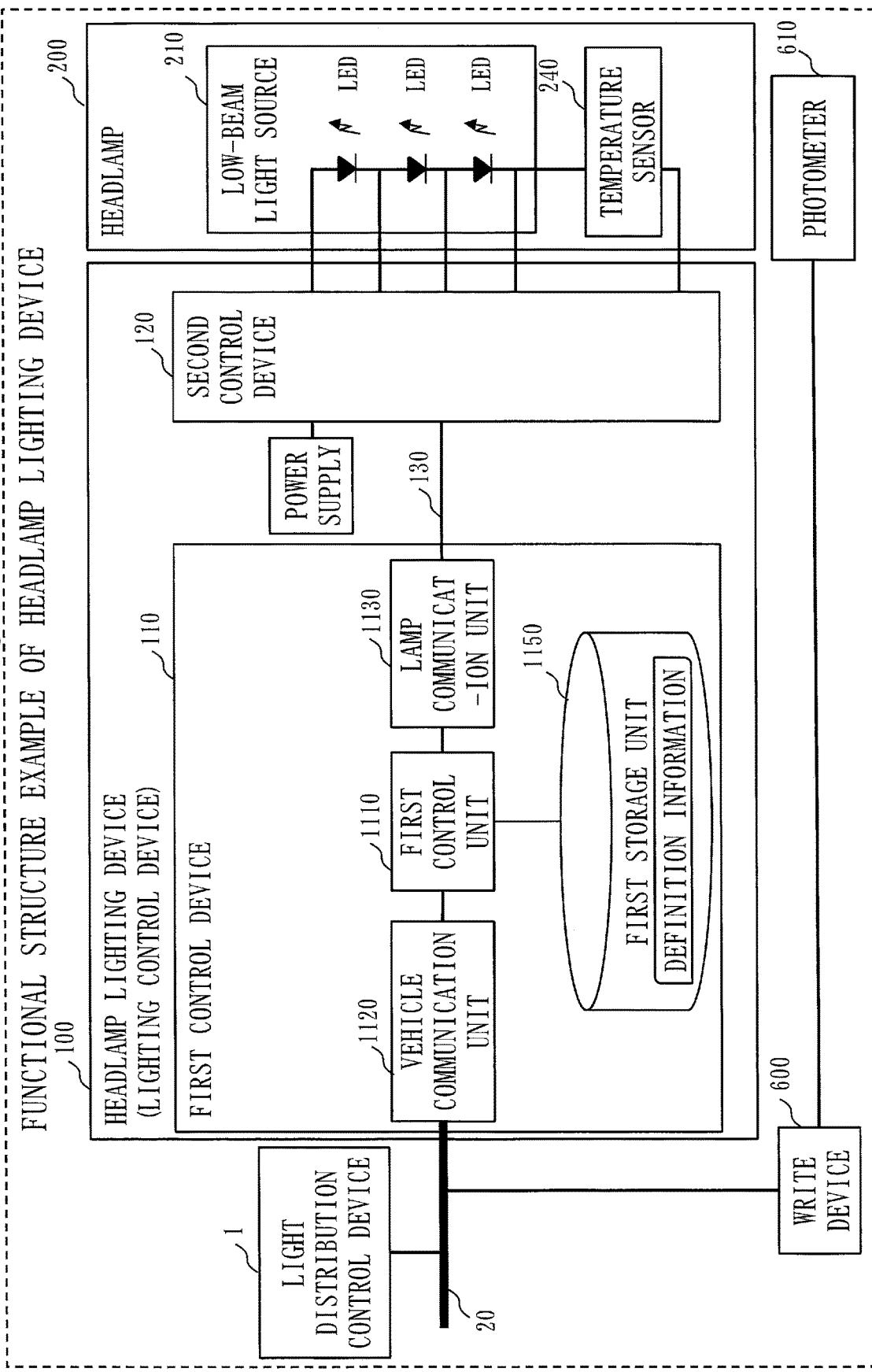
FIG. 5 illustrates a functional structure example of the headlamp lighting device according to Embodiment 1.
Figure 6:
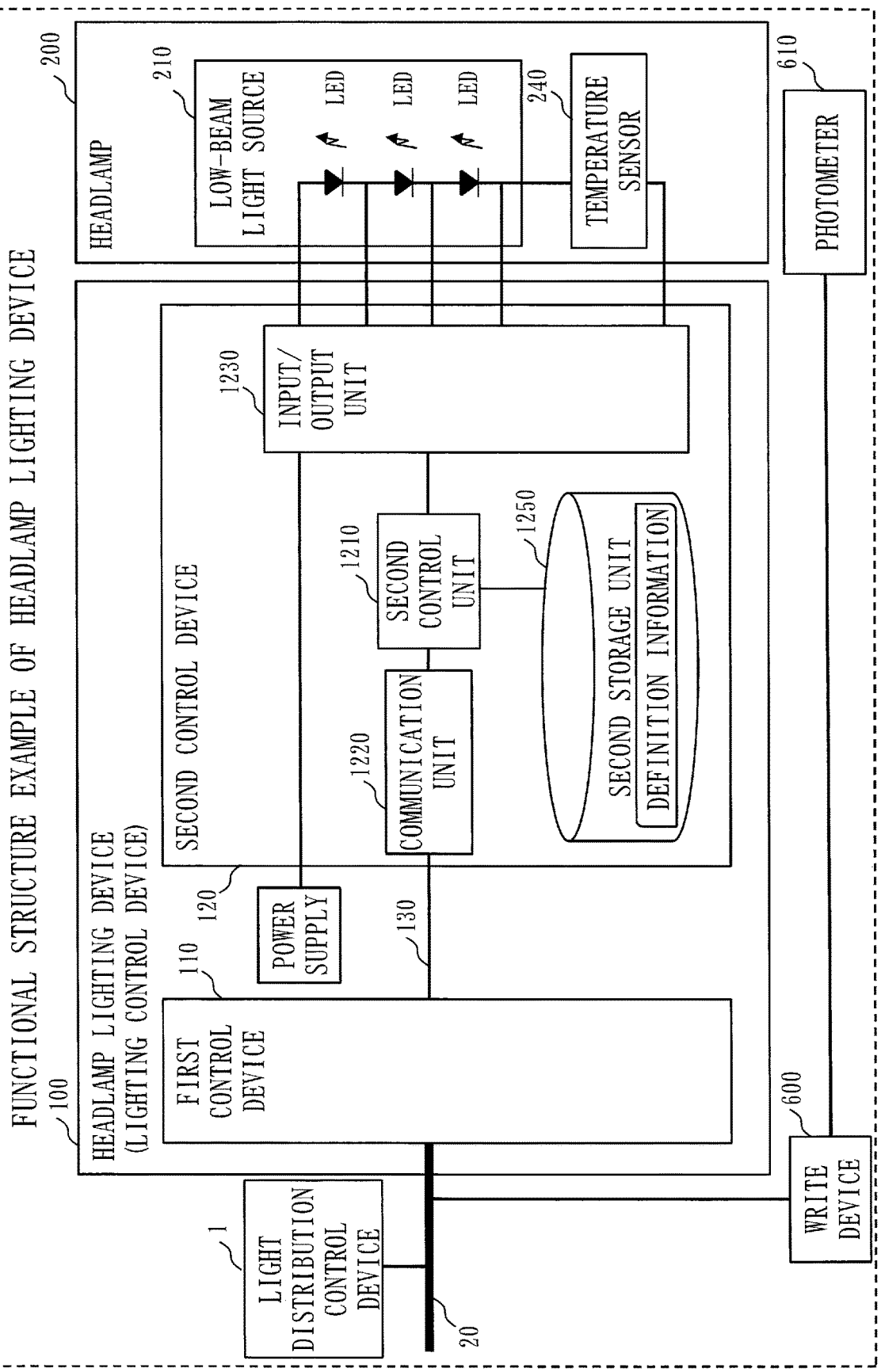
FIG. 6 illustrates a functional structure example of the headlamp lighting device according to Embodiment 1.

FIG. 5 and FIG. 6 each illustrate a functional structure example of the headlamp lighting device 100 according to the present embodiment.

FIG. 5 mainly illustrates a functional structure example of the first control device 110, and FIG. 6 mainly illustrates a functional structure example of the second control device 120.

Note that while only one second control device 120 is illustrated in FIG. 5 and FIG. 6 by reason of drawing creation, it is assumed that, as illustrated in FIG. 2, three second control devices 120 are arranged on the headlamp lighting device 100. All second control devices 120 have the functional structure illustrated in FIG. 6. Note that, as described above, the number of second control devices 120 arranged on the headlamp lighting device 100 is not limited to three.

As illustrated in FIG. 5, the first control device 110 is configured of the first control unit 1110, the vehicle communication unit 1120, the lamp communication unit 1130, and the first storage unit 1150.

The first storage unit 1150 stores definition information of two types.

The first storage unit 1150 stores definition information where a connection relation between the second control device 120 and the light source of each lamp device is presented. Also, the first storage unit 1150 stores control information in which a plurality of situations (scenes) are presented and, for each of the situations (scenes), a control-target light source, which is a light source as a control target, and a lighting pattern, which is a time transition of a luminance value of the control-target light source, are presented.

The first storage unit 1150 stores, for example, definition information illustrated in FIG. 8 and definition information illustrated in FIG. 9.

In the definition information illustrated in FIG. 8, for each second control device 120, the light source number of a light source connected to the second control device 120 and the type of a lamp device to which each light source belongs are presented. The definition information illustrated in FIG. 8 is referred to as definition information (connection information). The definition information (connection information) is also simply referred to as connection information.

In the definition information illustrated in FIG. 9, for each scene, the light source number of the control-target light source and the time transition (lighting pattern) of the luminance value of each control-target light source are presented. "1", "2", "3", and "50" written in a field of "luminance value (%)" of FIG. 9 each indicate a time per unit time. The unit time is, for example, 50 milliseconds, 100 milliseconds, or the like. In the following, "milliseconds" will be represented as "ms". The time transition (lighting pattern) of the luminance value illustrated in FIG. 9 is also referred to as map data. The definition information illustrated in FIG. 9 is referred to as definition information (lighting pattern information). The definition information (lighting pattern information) is also simply referred to as lighting pattern information.

The first storage unit 1150 corresponds to a storage unit, together with the second storage unit 1250, which will be described further below.

The vehicle communication unit 1120 receives the instruction information transmitted from the light distribution control device 1 via the vehicle communication interface 1106.

The vehicle communication unit 1120 transfers the received instruction information to the first control unit 1110.

Based on the instruction information, for each of the lamp devices, the first control unit 1110 determines light-up or light-out of each of the light sources configuring the lamp device and also determines a luminance of each of the lamp devices.

By referring to the definition information stored in the first storage unit 1150, for each of the lamp devices, the first control unit 1110 determines light-up or light-out of each of the light sources configuring the lamp device. Also, the first control unit 1110 selects, from the lighting pattern information, the control-target light source and the lighting pattern described for the scene corresponding to the current situation (scene) described in the instruction information, and determines a luminance value of the control-target light source by following the lighting pattern.

Also, the first control unit 1110 generates a control signal for making a notification of the determined light-up or light-out of each control-target light source and luminance of each control-target light source. Then, the first control unit 1110 transfers the generated control signal to the lamp communication unit 1130.

The first control unit 1110 corresponds to a control unit together with the second control unit 1210, which will be described further below.

The lamp communication unit 1130 transmits the control signal generated by the first control unit 1110 via the lamp communication interface 1107 to the second control device 120.

As illustrated in FIG. 6, the second control device 120 is configured of the second control unit 1210, the communication unit 1220, the input/output unit 1230, and the second storage unit 1250.

The second storage unit 1250 stores definition information.

The second storage unit 1250 stores definition information in which a supply current value, which is a current value to be supplied to each light source, is defined.

The second storage unit 1250 stores definition information illustrated in FIG. 10.

In the definition information illustrated in FIG. 10, whether each light source is connected/disconnected and a supply current value are presented.

The definition information illustrated in FIG. 10 is referred to as definition information (light source control information). The definition information (light source control information) is also simply represented as light source control information.

The communication unit 1220 receives the control signal transmitted from the first control device 110 via the communication interface 1206.

The communication unit 1220 transfers the received control signal to the second control unit 1210.

The second control unit 1210 controls the luminance of each light source based on the control signal.

The second control unit 1210 controls the luminance of each light source by referring to the light source control information stored in the second storage unit 1250.

More specifically, the second control unit 1210 determines a PWM control value for each light source by referring to the light source control information. Then, the second control unit 1210 notifies the input/output unit 1230 of the determined PWM control value for each light source.

The input/output unit 1230 outputs the PWM control value notified from the second control unit 1210 via the input/output interface 1207 to the low-beam light source 210.

In this manner, in the definition information stored in the first storage unit 1150, the plurality of lamp devices arranged on the vehicle are presented and, for each of the lamp devices, one or more light sources configuring the lamp device are presented. Also, in the definition information stored in the second storage unit 1250, the control value (supply current value) for controlling each of the light sources is presented. Also, in the definition information stored in the first storage unit 1150, the plurality of situations are presented and, for each of the situations, a control-target light source and a lighting pattern, which is a time transition of the luminance value of the control-target light source, are presented.

And, for each of the lamp devices, the first control unit 1110 and the second control unit 1210 cooperate to control lighting of each of the light sources configuring the lamp device. Also, the first control unit 1110 and the second control unit 1210 cooperate to select a control-target light source and a lighting pattern corresponding to the current situation and control lighting of the selected control-target light source by using the selected lighting pattern and the control value of the selected control-target light source.

Note that a write device 600 can be connected to the network 20 from outside the vehicle.

The write device 600 can rewrite the program to be executed in the first control device 110 and the program to be executed in the second control device 120.

Also, the write device 600 can rewrite the definition information stored in the first control device 110 and the definition information stored in the second control device 120.

Also, a photometer 610 can be connected to the write device 600. The photometer 610 can measure luminosities of the headlamp 200 and the headlamp 400.

*Description of Operation*

Next, the operation of the headlamp lighting device 100 according to the present embodiment is described.

<Description of Operation (1) Headlamp Lighting Operation>

Figure 7:
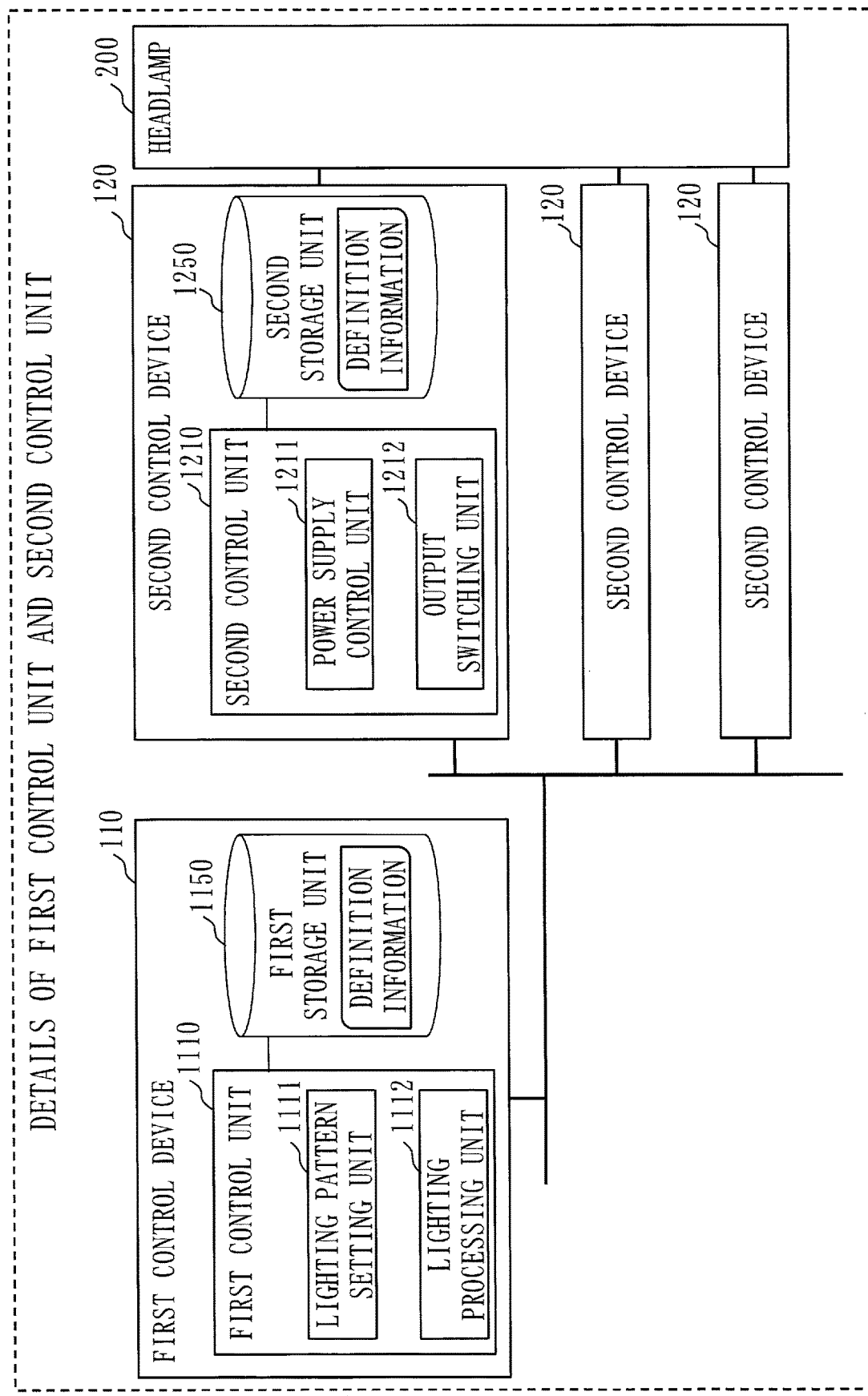
FIG. 7 illustrates details of a first control unit and a second control unit according to Embodiment 1.

FIG. 7 illustrates a flow of the headlamp lighting operation.

Figure 11:
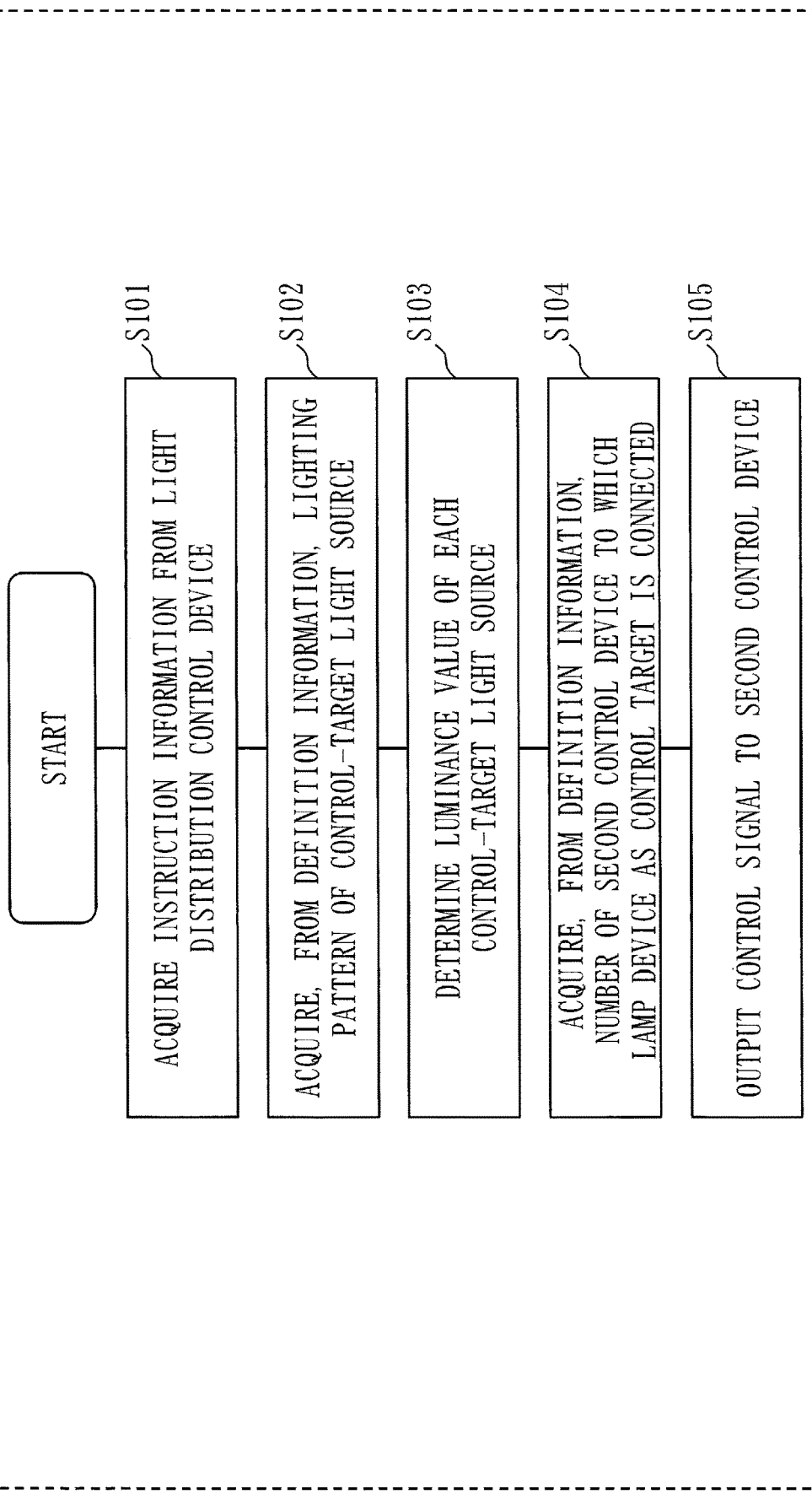
FIG. 11 is a flowchart illustrating an operation example of the first control device according to Embodiment 1.
Figure 12:
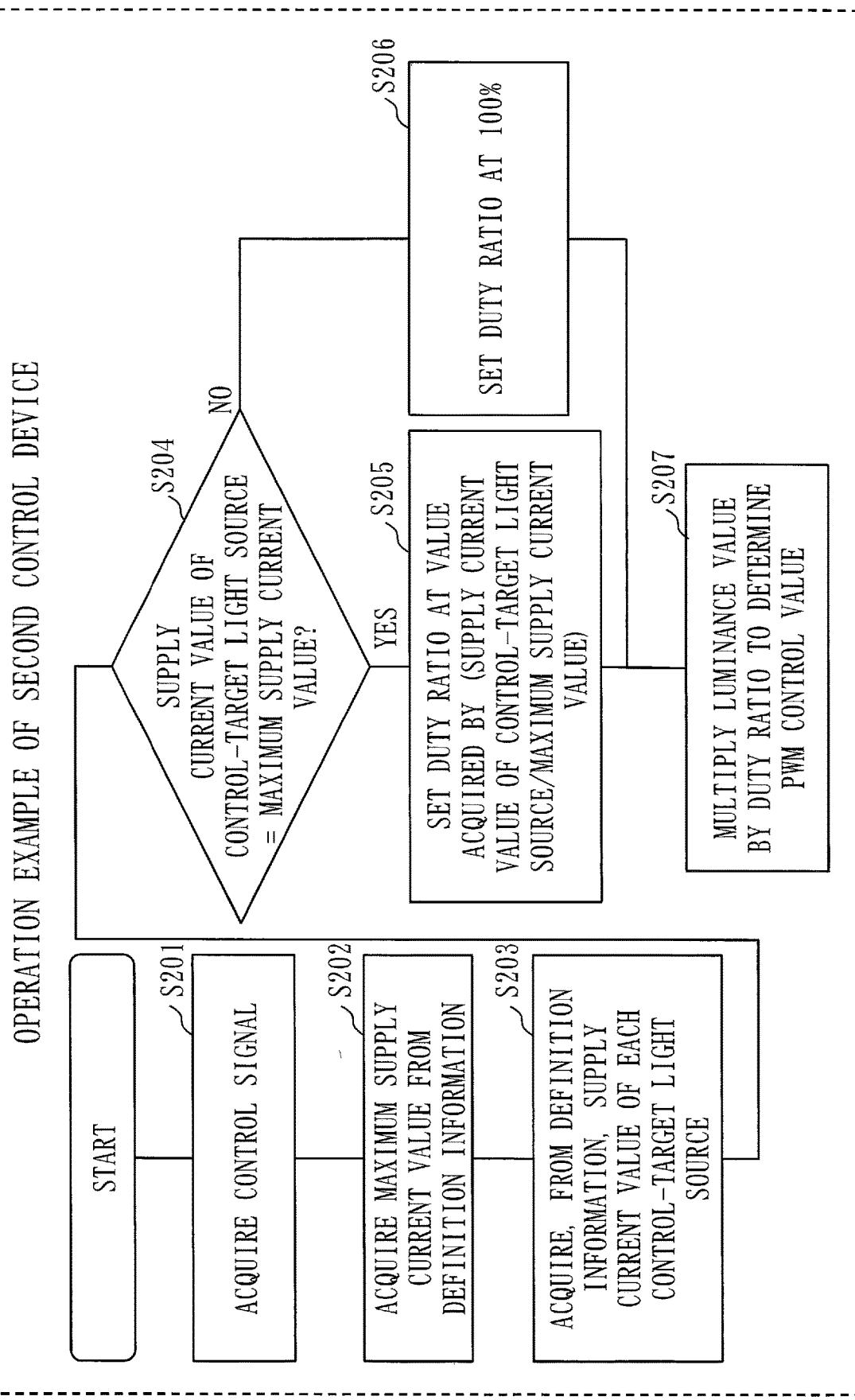
FIG. 12 illustrates a flowchart illustrating an operation example of the second control device according to Embodiment 1.

FIG. 11 illustrates the headlamp lighting operation of the first control device 110. FIG. 12 illustrates the headlamp lighting operation of the second control device 120.

In the following, by referring to FIG. 7, FIG. 11, and FIG. 12, the headlamp lighting operation is described.

Also in the following, as for blinker lighting control, for simplification of description, only an example is described in which the first control device 110 and the second control device 120 control lighting of a front blinker included in the headlamp. However, the first control device 110 and the second control device 120 can also control lighting of a side blinker arranged on a side surface of the vehicle and a rear blinker included in a tail lamp with a procedure similar to the lighting control of the front blinker.

As illustrated in FIG. 7, the first control unit 1110 includes a lighting pattern setting unit 1111 and a lighting processing unit 1112.

The lighting pattern setting unit 1111 determines a lighting pattern for each lamp device.

The lighting processing unit 1112 outputs a control signal to the second control device 120.

As described above, the first storage unit 1150 retains the connection information illustrated in FIG. 8 and the lighting pattern information illustrated in FIG. 9.

The connection information of FIG. 8 is information for controlling the second control device 120 connected to the first control device 110. In the connection information, whether the second control device 120 is connected/disconnected, whether a light source controllable by the second control device 120 is connected/disconnected, and the type of a lamp device for which each light source is used are defined.

In the lighting pattern information of FIG. 9, the light source number of the control-target light source and the lighting pattern are defined for each scene. In the lighting pattern, gradation values of the luminance of the control-target light source are presented on a time-series basis.

The lighting pattern setting unit 1111 acquires, from the vehicle communication unit 1120, instruction information transmitted from the light distribution control device 1 (step S101 of FIG. 11).

Next, based on the instruction information, the lighting pattern setting unit 1111 acquires the lighting pattern of the control-target light source from the lighting pattern information retained in the first storage unit 1150 (step S102 of FIG. 11). For example, it is assumed that instruction information for making a notification of "scene: sunny" is transmitted from the light distribution control device 1. The lighting pattern setting unit 1111 extracts, in the lighting pattern information, "scene: sunny" corresponding to "scene: sunny" notified in the instruction information. Then, the lighting pattern setting unit 1111 acquires "low beam" written for "scene: sunny", as a lamp device as a control target. Also, the lighting pattern setting unit 1111 acquires light source numbers 1 and 2 of "low beam" as control-target light sources. Also, the lighting pattern setting unit 1111 acquires a lighting pattern written for "scene: sunny".

Next, the lighting pattern setting unit 1111 determines a luminance value of the control-target light source based on the lighting pattern (step S103 of FIG. 11). Details of step S103 are illustrated in FIG. 30, FIG. 31, and FIG. 32.

Figure 30:
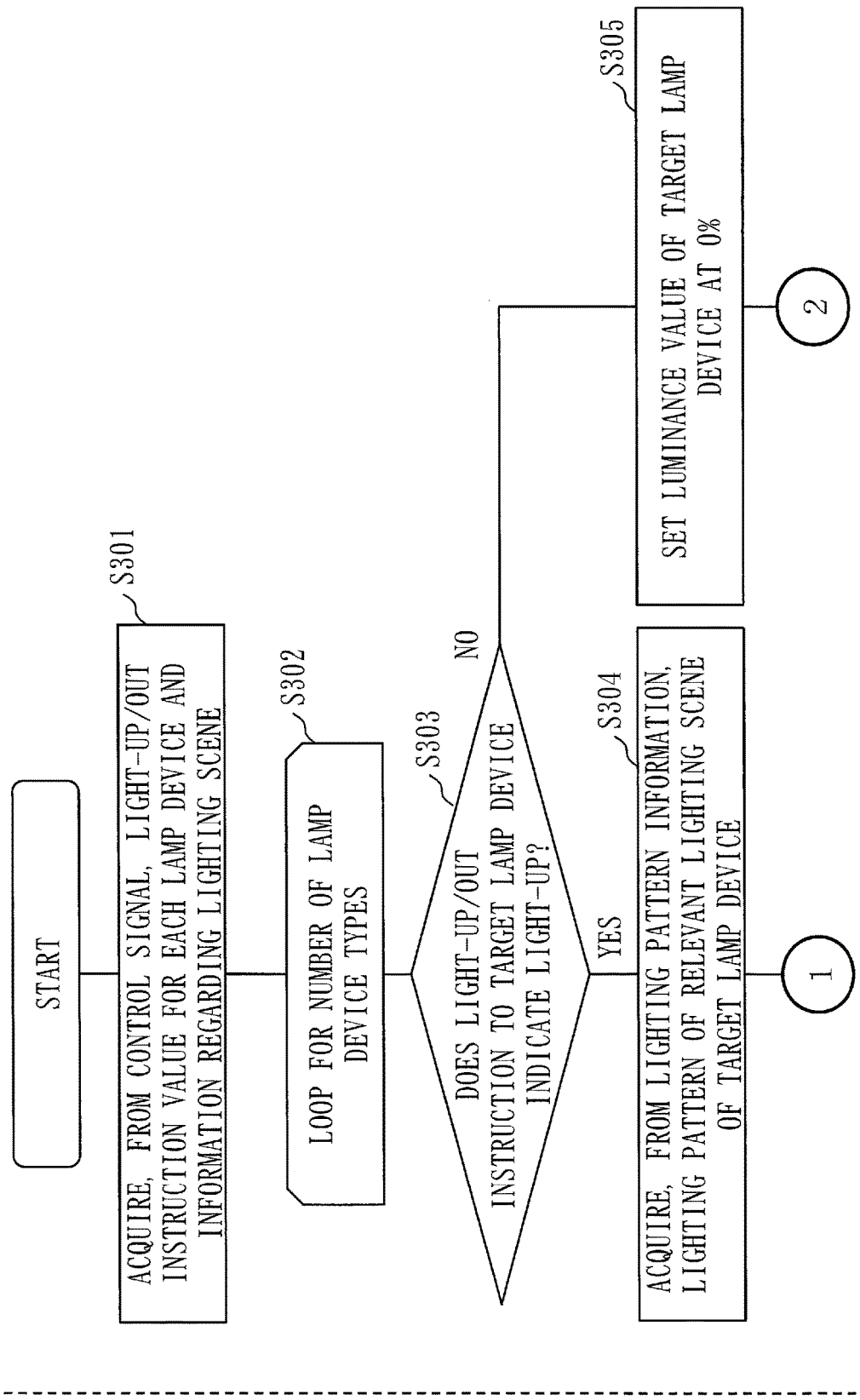
FIG. 30 is a flowchart illustrating a luminance value determination method according to Embodiment 1.

The lighting pattern setting unit 1111 acquires, from the vehicle communication unit 1120, instruction information transmitted from the light distribution control device 1 and, based on the instruction information, acquires the lighting pattern of the control-target light source from the lighting pattern information retained in the first storage unit 1150 (step S301 of FIG. 30). Next, the lighting pattern setting unit 1111 determines a lighting value for each lamp device as the control target (step S302 of FIG. 30).

Based on the instruction information for each target lamp device, the lighting pattern setting unit 1111 judges whether the instruction to the target lamp device is light-up or light-out (step S303 of FIG. 30). When the instruction to the target lamp device is light-up, the lighting pattern setting unit 1111 acquires map data of the relevant lighting scene of the target lamp device (step S304 of FIG. 30). When the instruction to the target lamp device is light-out, the luminance value is set at 0% (step S305 of FIG. 30).

Figure 31:
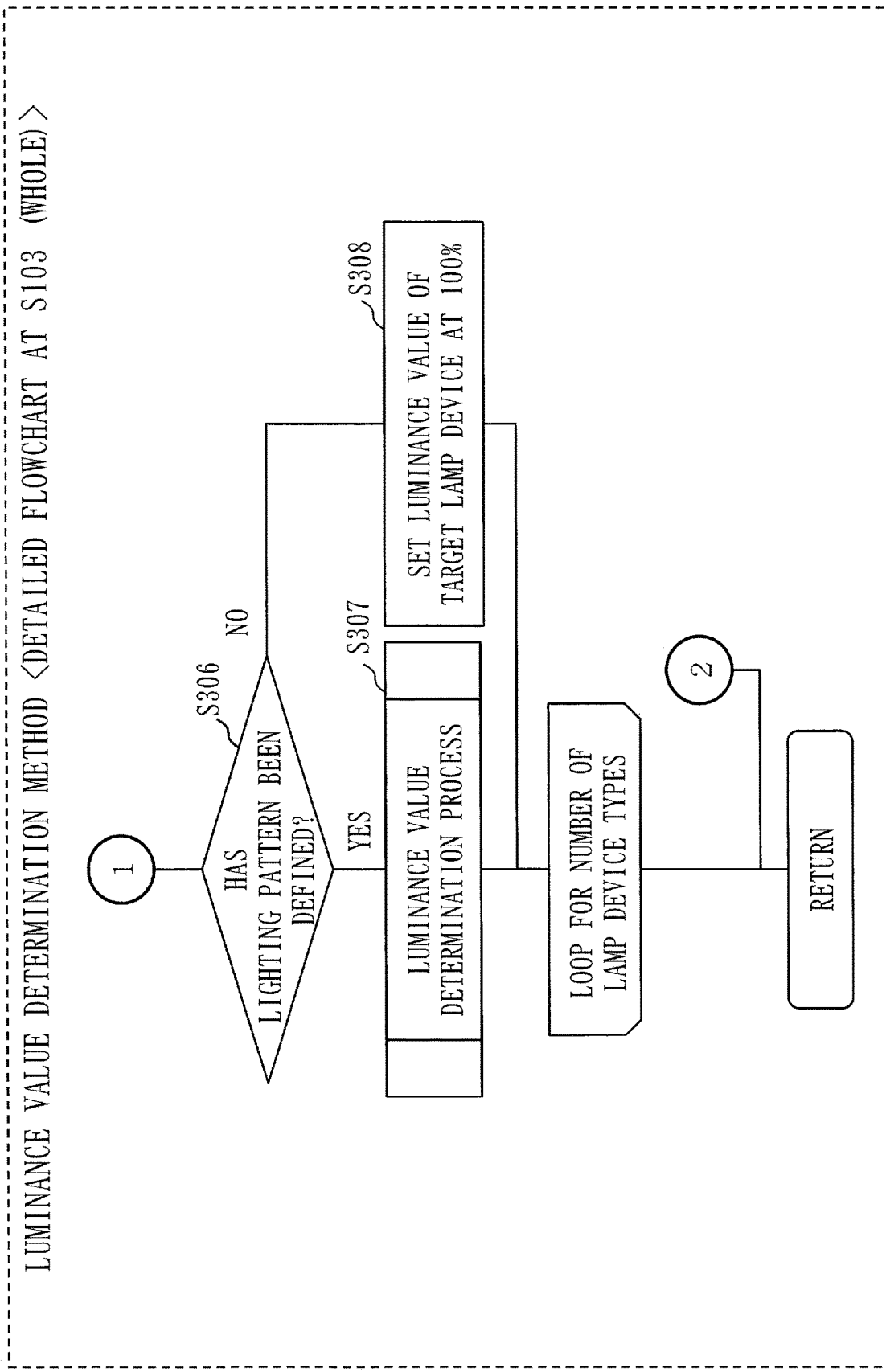
FIG. 31 is a flowchart illustrating the luminance value determination method according to Embodiment 1.
Figure 32:
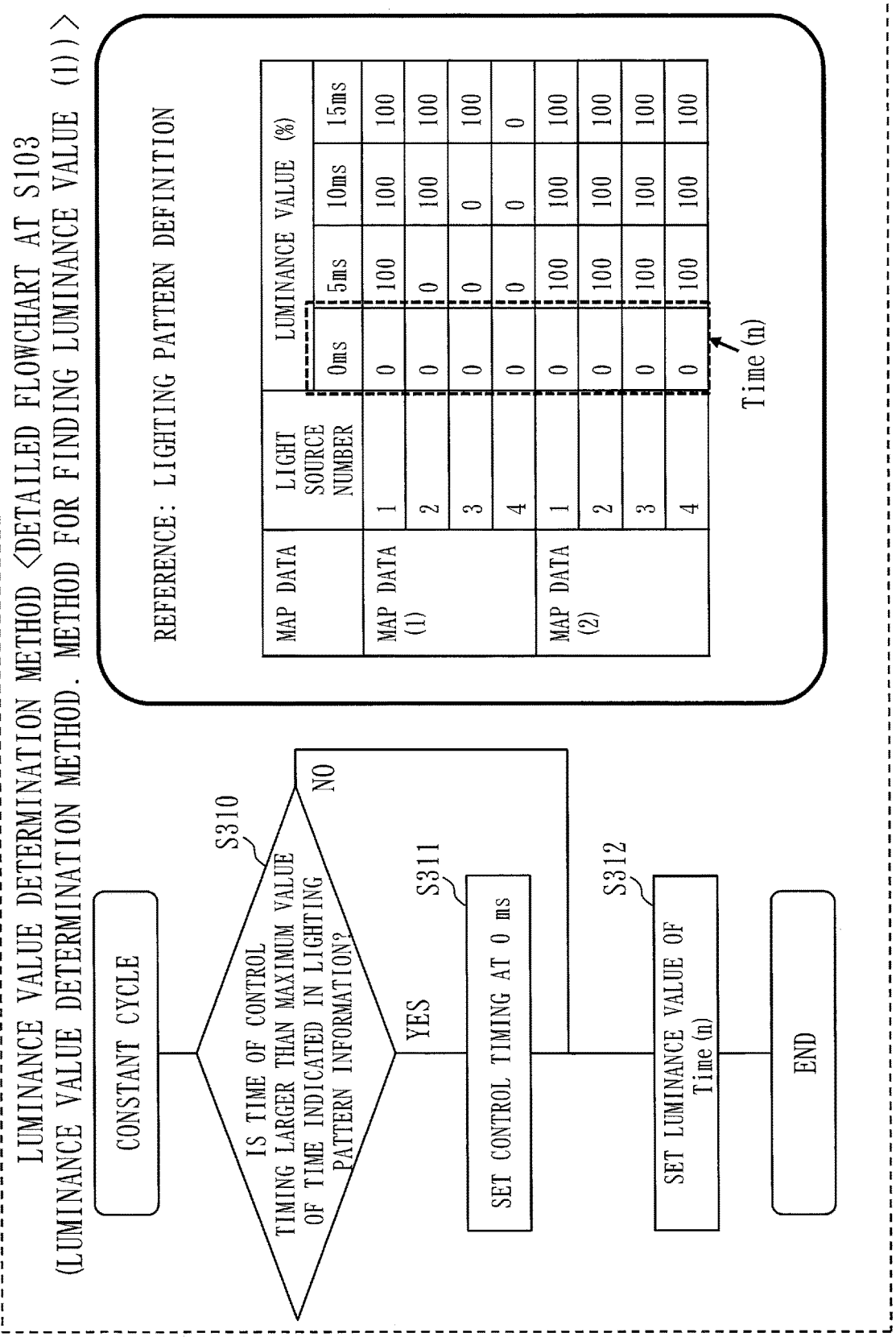
FIG. 32 is a flowchart illustrating the luminance value determination method according to Embodiment 1.

The lighting pattern setting unit 1111 judges whether the lighting pattern corresponding to the instruction information has been defined in the lighting pattern information (step S306 of FIG. 31). If the lighting pattern has been defined, the lighting pattern setting unit 1111 determines a luminance value by using the acquired lighting pattern (step S307 of FIG. 31). If the lighting pattern corresponding to the instruction information has not been defined, the lighting pattern setting unit 1111 sets the luminance value at 100% (step S308 of FIG. 31).

The lighting pattern setting unit 1111 determines the luminance value for each control cycle (for example, 5 ms). In the lighting pattern for setting a time transition of the luminance value, luminance values per unit time are recorded for a predetermined time. For example, as illustrated in FIG. 32, luminance values per cycle of 5 ms, which is equal to the control cycle, are set for a cycle of 20 ms (n=0 to 3). In luminance value determination, a first control timing when a notification of a lighting instruction is provided to the target lamp device is assumed to be 0 ms.

The lighting pattern setting unit 1111 judges whether the time of the current control timing is larger than the maximum value of the time indicated in the lighting pattern information (step S310 of FIG. 32). When the time is larger than the maximum value of the time indicated in the lighting pattern information, the lighting pattern setting unit 1111 returns the control timing to 0 ms (step S311 of FIG. 32).

The lighting pattern setting unit 1111 selects a luminance value with the time indicated in the lighting pattern information matching the time of the current control timing (step S312 of FIG. 32).

Note that while it is described in the present description that the luminance value is determined by using the map data only at the time of light-up, the luminance value may be determined by using map data also at the time of light-out.

Then, the lighting pattern setting unit 1111 notifies the lighting processing unit 1112 of the lamp device as the control target, the control-target light source, and the luminance value.

The lighting processing unit 1112 acquires, from the connection information retained in the first storage unit 1150, the number of the second control device 120 connected to the lamp device notified from the lighting pattern setting unit 1111 (step S104 of FIG. 11). For example, when notified of "low beam" from the lighting pattern setting unit 1111, the lighting processing unit 1112 acquires "1" as the number of the second control device 120 from the connection information.

Then, the lighting processing unit 1112 outputs, via the lamp communication unit 1130 to the relevant second control device 120, a control signal for making a notification of the control-target light source and the luminance value notified from the lighting pattern setting unit 1111 (step S105 of FIG. 11).

As illustrated in FIG. 7, the second control unit 1210 includes a power supply control unit 1211 and an output switching unit 1212.

The power supply control unit 1211 supplies power required for lighting of the light source.

The output switching unit 1212 performs switch control for adjusting luminance of the light source.

The output switching unit 1212 adjusts luminance of the control-target light source by using, for example, the luminance control method described in Patent Literature 1.

As described above, the second storage unit 1250 retains the light source control information illustrated in FIG. 10.

The light source control information of FIG. 10 is information for controlling the light source of the headlamp 200 connected to the second control device 120. In the light source control information, whether the light source is connected/disconnected and a supply current value to be supplied to the light source are written, as illustrated in FIG. 10.

The power supply control unit 1211 acquires, from the communication unit 1220, a control signal transmitted from the first control device 110 (step S201 of FIG. 12).

Next, the power supply control unit 1211 acquires a maximum supply current value from among a plurality of supply current values included in the light source control information (step S202 of FIG. 12). And, the power supply control unit 1211 notifies the output switching unit 1212 of the acquired supply current value.

The output switching unit 1212 acquires a supply current value of each control-target light source from the light source control information (step S203 of FIG. 12).

Then, for each control-target light source, the output switching unit 1212 compares the maximum supply current value with the supply current value of the control-target light source (step S204 of FIG. 12).

When the maximum supply current value and the supply current value of the control-target light source are different from each other, the output switching unit 1212 sets a duty ratio of the control-target light source at a value acquired by dividing the supply current value of the control-target light source by the maximum supply current value (step S205 of FIG. 12).

On the other hand, when the maximum supply current value and the supply current value of the control-target light source are equal to each other, the output switching unit 1212 sets the duty ratio at 100% (step S206 of FIG. 12).

The output switching unit 1212 multiplies the luminance value of the control-target light source notified from the first control device 110 by the duty ratio to determine a PWM control value for each luminance value (step S207 of FIG. 12). Then, by using the determined PWM control value, the output switching unit 1212 performs switch control to perform luminance control of the control-target light source.

As described above, by referring to the definition information, for each of the lamp devices, the headlamp lighting device 100 controls lighting of each of the light sources configuring the lamp device.

Thus, by changing the definition information in accordance with the specification of the lamp device arranged on the vehicle, the headlamp lighting device 100 can control various lamp devices by absorbing specification differences among the lamp devices. That is, the headlamp arranged on the vehicle can be controlled without redesigning the programs for the first control device 110 and the second control device 120. Also, the second control device 120 can be made as a component. In accordance with the structure of the headlamp, the second control devices 120 as many as required can be implemented.

<Description of Operation (2) Method of Finding Luminance Value (1)>

Figure 13:
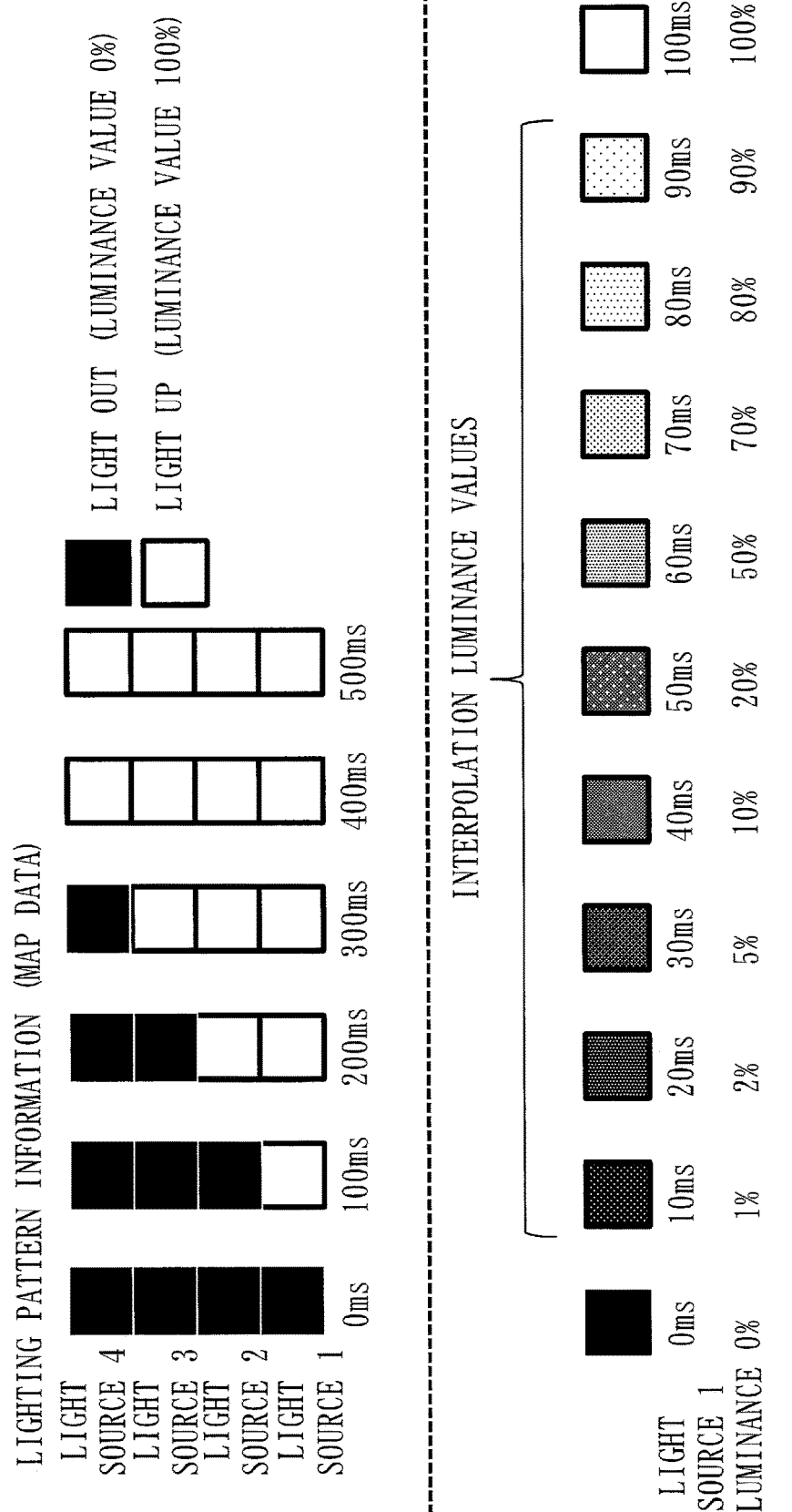
FIG. 13 describes a luminance value determination method according to Embodiment 1.

FIG. 13 describes a luminance value determination method at step S103 of FIG. 11.

In an example of FIG. 13, the control cycle of the first control device 110 is assumed to be 10 ms. That is, in the first control device 110, a control timing comes every 10 ms. Also in the example of FIG. 13, the unit time of the lighting pattern information retained in the first storage unit 1150 is assumed to be 100 ms.

The lighting pattern setting unit 1111 acquires instruction information transmitted from the light distribution control device 1, and acquires a lighting pattern of the control-target light source from the first storage unit 1150. Then, a luminance value at the current control timing is determined. More specifically, if the time of the current control timing matches the time indicated by the lighting pattern information, the lighting pattern setting unit 1111 selects the luminance value described in the lighting pattern information. For example, if the current control timing is 0 ms, the luminance value at 0 ms described in the lighting pattern information is selected.

On the other hand, when the current control timing does not match the time indicated by the lighting pattern information, the lighting pattern setting unit 1111 acquires a luminance value at a nearest time before the time of the current control timing among times written in the lighting pattern information. Also, the lighting pattern setting unit 1111 acquires a luminance value at a nearest time after the time of the current control timing among the times described in the lighting pattern information. For example, if the current control timing is 10 ms, the luminance value at 0 ms described in the lighting pattern information and the luminance value at 100 ms described in the lighting pattern information are acquired.

Then, by using a data interpolation function, the lighting pattern setting unit 1111 determines a luminance value at the control timing.

For example, as a data interpolation function, the lighting pattern setting unit 1111 uses a control expression as below.

$L(t)=kt^\alpha$

L(t): luminance value at a time t

α: exponent k: constant

In the above-described control expression, as a value of the exponent α, α=1/0.33 is preferably used from a relationship between sensory amount and physical amount of stimulation during dark adaptation defined in the Stevens' law.

In the lighting pattern information illustrated on an upper row of FIG. 13, at a time 0 ms, a light source 1 to a light source 4 all have a luminance value of 0%. Also, at a time 100 ms, the luminance value of the light source 1 is 100%.

On a lower row of FIG. 13, changes of the luminance of the light source 1 every 10 ms are illustrated. The luminance values at times 10 ms to 90 ms are interpolation luminance values calculated by the lighting pattern setting unit 1111 using the data interpolation function.

As illustrated on the lower row of FIG. 13, by setting interpolation luminance values, the lighting pattern setting unit 1111 generates a lighting pattern of increasing the gradation value of luminance in a stepwise manner between the time of 0 ms and the time 100 ms.

Then, the second control device 120 controls lighting of the control-target light source by the time transition of the luminance value determined by the lighting pattern setting unit 1111.

That is, as illustrated on the lower row of FIG. 13, the second control device 120 smoothly increases the luminance value of the light source 1 by following the luminance value at the time 0 ms, the interpolation luminance values between the time 10 ms to the time 90 ms, and the luminance value of the time 100 ms.

When control is performed in a control cycle of 10 ms, if the interpolation luminance values as described above are not used, 200 bytes (the number of light sources (4)×the number of times of defining the luminance value (50)×the amount of information (1 byte)) are required for the lighting pattern information in a cycle of 500 ms when the luminance value is represented with one byte. On the other hand, when the interpolation luminance values as described above are used, the lighting pattern information in the cycle of 500 ms only requires 20 bytes (the number of light sources (4)×the number of times of defining the luminance value (5)×the amount of information (1 byte)).

In this manner, by using the interpolation luminance values, the luminance can be smoothly changed without causing an abrupt luminance change. Also, the amount of information of the lighting pattern information can be reduced.

Figure 33:
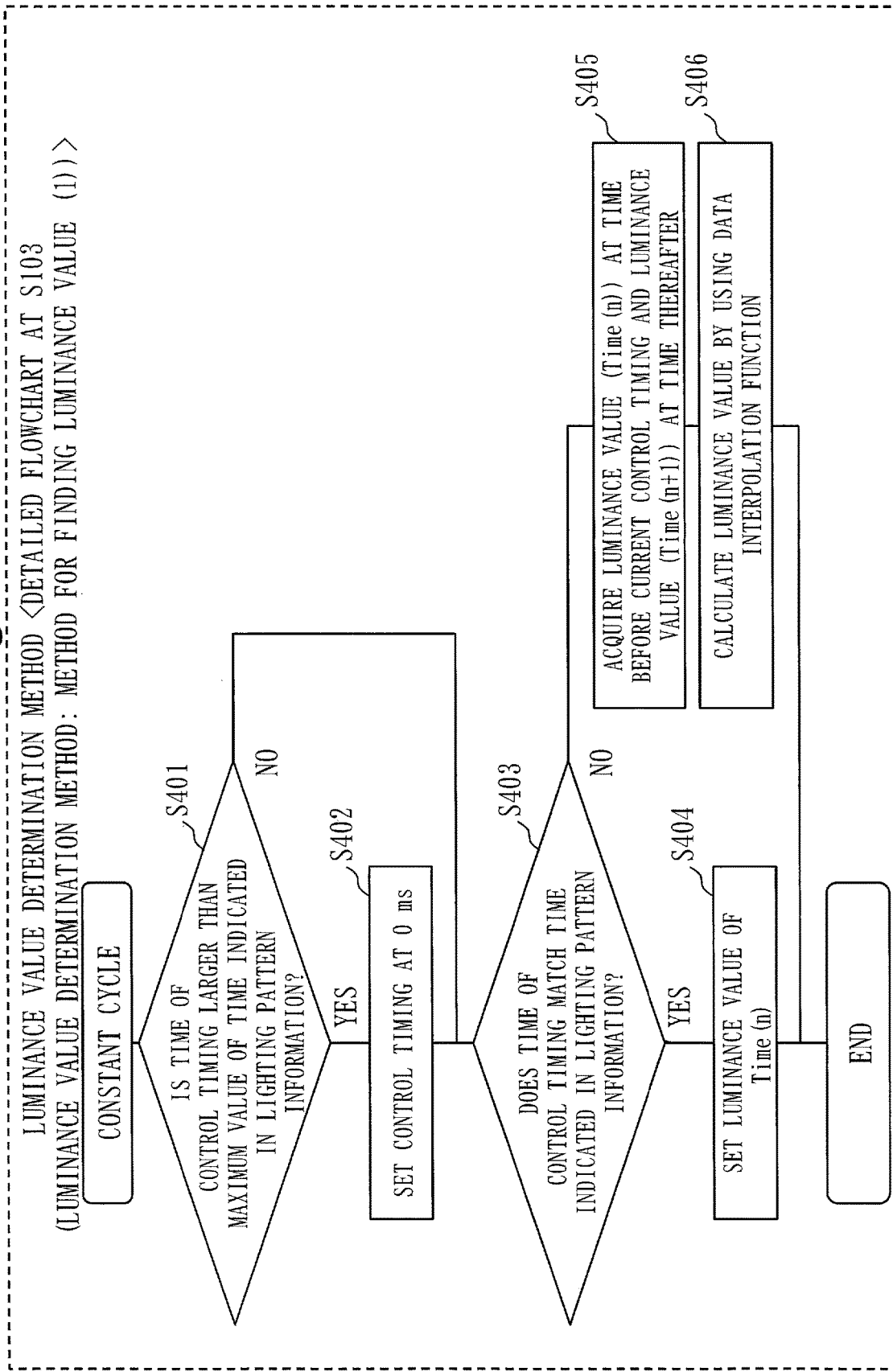
FIG. 33 is a flowchart illustrating the luminance value determination method according to Embodiment 1.

Note that the above-described luminance value determination method described by using FIG. 13 is performed by following a flow illustrated in FIG. 33. Also, FIG. 34 illustrates a relation between the control cycle of the first control device 110 and an interval of unit times of the lighting pattern information.

The lighting pattern setting unit 1111 determines a luminance value for each control cycle (for example, 10 ms). In the map data for setting a time transition of the luminance value, luminance values per unit time are recorded for a predetermined time. For example, as illustrated in FIG. 34, luminance values per cycle of 100 ms are set for a cycle of 400 ms (n=0 to 3). In luminance value determination, a first control timing when a notification of a lighting instruction is provided to the target lamp device is assumed to be 0 ms.

The lighting pattern setting unit 1111 judges whether the time of the current control timing is larger than the maximum value of the time indicated in the lighting pattern information (step S401 of FIG. 33). When the time is larger than the maximum value of the time indicated in the lighting pattern information, the lighting pattern setting unit 1111 returns the control timing to 0 ms (step S402 of FIG. 33).

The lighting pattern setting unit 1111 judges whether the time of the current control timing matches the time indicated in the lighting pattern information (step S403 of FIG. 33). When the time of the current control timing matches the time indicated in the lighting pattern information, the lighting pattern setting unit 1111 selects a luminance value written in the lighting pattern information (step S404 of FIG. 33). On the other hand, when the current control timing does not match the time indicated in the lighting pattern information, the lighting pattern setting unit 1111 acquires a luminance value at a nearest time (Time(n)) before the time of the current control timing among times written in the lighting pattern information and a luminance value at a nearest time (Time(n+1)) after the time of the current control timing among times written in the lighting pattern information (step S405 of FIG. 33). From the acquired luminance values, by using the data interpolation function ($L(t)=kt^\alpha$), the lighting pattern setting unit 1111 determines a luminance value at the current control timing (step S406 of FIG. 33). Here, the data interpolation function is found by using the following control expression.

$$k=1/((\text{Time}(n+1)-\text{Time}(n))^\alpha)\times\text{luminance value at Time}(n+1)$$

Note that while it is described in the present description that the luminance value is determined by using the map data only at the time of light-up, the luminance value may be determined by using map data also at the time of light-out.

<Description of Operation (3) Method of Finding Luminance Value (2)>

In the following, another example of the luminance value determination method at step S103 of FIG. 11 is described.

FIG. 14 illustrates an example of definition information (lighting pattern information) with combination of map data and mask patterns.

FIG. 15 illustrates an example of map data (1) and map data (2) illustrated in FIG. 14.

FIG. 16 illustrates an example of a mask pattern (1) and a mask pattern (2) illustrated in FIG. 14.

FIG. 17 illustrates a lighting example of the map data (1) and a lighting example of the map data (2).

Figure 18:
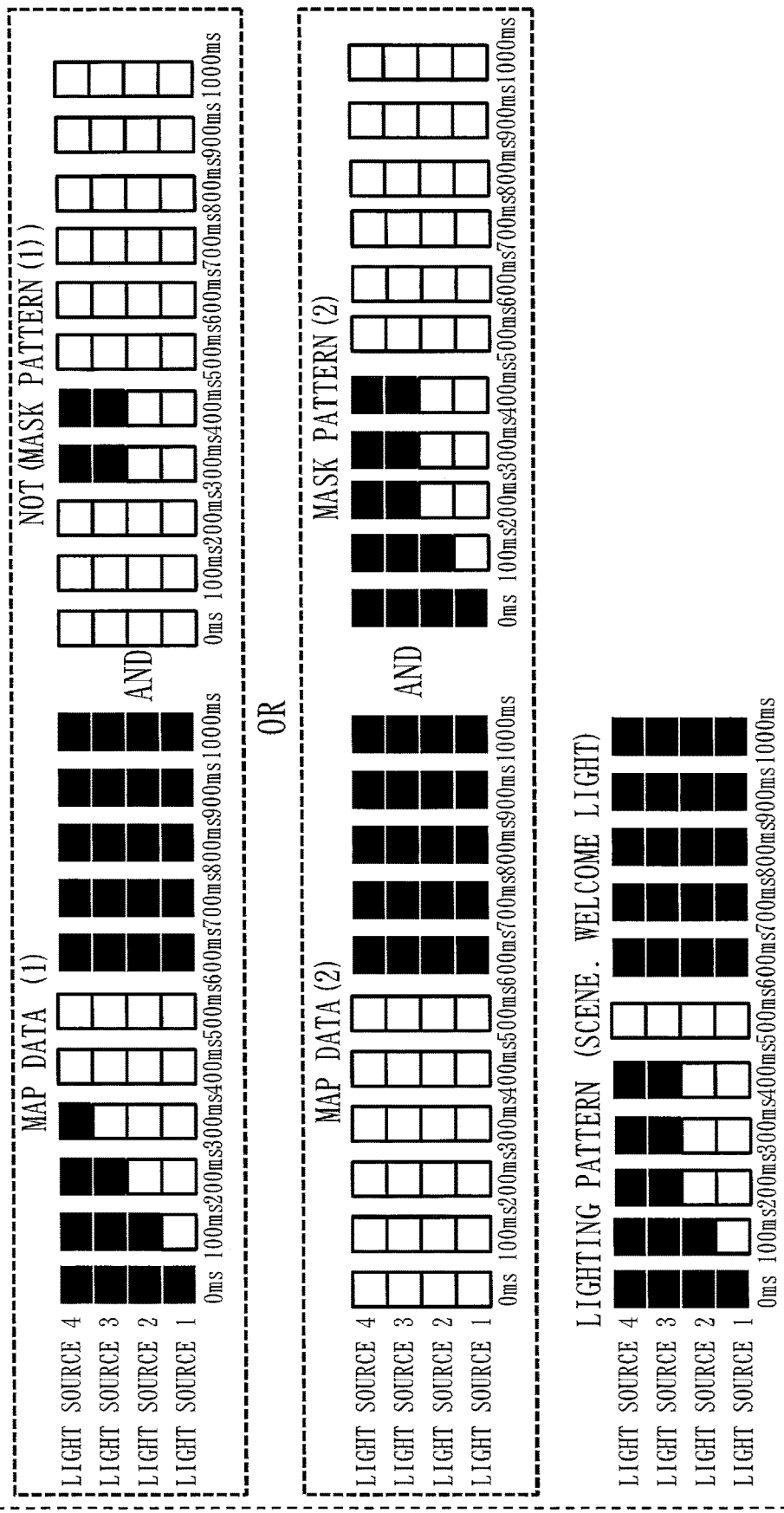
FIG. 18 illustrates a lighting example with combination of the map data and the mask patterns according to Embodiment 1.

FIG. 18 illustrates a lighting example with combination of the map data and the mask patterns.

In the definition information (lighting pattern information) retained by the first storage unit 1150 in the first control device 110, a typical lighting pattern is defined. For example, map data (1) and map data (2) are defined as typical lighting patterns. The map data (1) indicates a lighting pattern as illustrated in FIG. 15 and FIG. 17 in which the light sources 1 to 4 sequentially light up during 500 ms and light out during 500 ms. Also, the map data (2) indicates a lighting pattern as illustrated in FIG. 15 and FIG. 17 in which the light sources 1 to 4 light up during 500 ms and light out during 500 ms.

The map data (1) indicates a lighting pattern corresponding to "scene: directional indicator" as illustrated in FIG. 14. Also, the map data (2) indicates a lighting pattern corresponding to "scene: hazard light" as illustrated in FIG. 14.

Also, in the definition information (lighting pattern information) retained by the first storage unit 1150, a mask pattern is also defined. For example, a mask pattern (1) and a mask pattern (2) are defined as mask patterns.

The mask pattern (1) is a pattern as illustrated in FIG. 16 in which the light source 3 and the light source 4 light up only in 300 ms and 400 ms. Also, the mask pattern (2) is a pattern as illustrated in FIG. 16 in which all light sources light out at 0 ms, only the light source 1 lights up at 100 ms, only the light source 1 and the light source 2 light up between 200 ms to 400 ms, and all light sources light up after 500 ms onward.

Also, in the definition information (lighting pattern information) retained by the first storage unit 1150, a lighting pattern acquired by combining a plurality of pieces of map data, a lighting pattern acquired by combining map data and a mask pattern, and a lighting pattern acquired by combining a plurality of pieces of map data and a plurality of mask patterns are defined.

In FIG. 14, it is defined that a lighting pattern of "scene: welcome light" can be acquired with a combination of the map data (1) and an inverted pattern of the mask pattern (1) (NOT mask pattern (1)) or a combination of the map data (2) and the mask pattern (2).

In this manner, the first storage unit 1150 stores definition information (lighting pattern information) in which the lighting pattern and a mask pattern (NOT mask pattern (1) or the mask pattern (2)) in a first situation ("scene: directional indicator" or "scene: hazard light") are used and a lighting pattern in a second situation ("scene: welcome light") different from the first situation is defined.

Also, although not illustrated, in the definition information (lighting pattern information), the lighting pattern in the first situation (for example, "scene: directional indicator") and the lighting pattern in the second situation (for example, "scene: hazard light") different from the first situation may be used to define a lighting pattern in a third situation (for example, "scene: welcome light") different from the first situation and the second situation.

The operation of the lighting pattern setting unit 1111 when the blinker is lit up as a welcome light is described.

The lighting pattern setting unit 1111 acquires, from the light distribution control device 1, instruction information for making a notification of "scene: welcome light". Then, the lighting pattern setting unit 1111 acquires a definition of a lighting pattern corresponding to "scene: welcome light" from the lighting pattern information retained in the first storage unit 1150. Here, the lighting pattern setting unit 1111 acquires the following, as illustrated in FIG. 14.

((Map data (1)) AND (NOT (mask pattern (1)))) OR ((map data (2)) AND (mask pattern (2)))

Next, the lighting pattern setting unit 1111 reads the relevant map data and mask pattern from the first storage unit 1150. Then, as illustrated in FIG. 18, based on the map data and the mask pattern, the lighting pattern setting unit 1111 generates a lighting pattern corresponding to "scene: welcome light". The lighting pattern setting unit 1111 determines a luminance value for each control timing in accordance with the generated lighting pattern.

In this manner, by using the combination of map data, the combination of map data and a mask pattern, and the combination of a plurality of pieces of map data and a plurality of mask patterns, the amount of information retained as lighting pattern information can be reduced.

Note that the method has been described above in which the lighting pattern information, the map data, and the mask patterns are retained in the first storage unit 1150 in the first control device 110 and the second control device 120 is notified of a luminance value from the first control device 110. However, the lighting pattern information may be retained in the first storage unit 1150 in the first control device 110 and the map data and the mask patterns may be retained in the second storage unit 1250 in the second control device 120. In this case, a lighting pattern is determined in the first control device 110, the second control device 120 is notified of lighting pattern information from the first control device 110, and a luminance value is determined in the second control device 120.

This structure can reduce the amount of data to be transmitted and received between the first control device 110 and the second control device 120.

<Description of Operation (4) Method of Finding Luminance Value (3)>

In the following, another example of the luminance value determination method at step S103 of FIG. 11 is described.

FIG. 19 illustrates definition information (lighting pattern information) configured of lighting patterns for each stage ((a) of FIG. 19) and map data for each stage ((b) of FIG. 19).

In FIG. 19, "scene: directional indicator" is separated into a scene start stage, a scene halfway stage, and a scene end stage. The scene start stage is for a period of one cycle (for example, one second) after the user operates a directional indicator lever to make an instruction for starting blinking of the directional indicator. The scene halfway stage is for a period after the scene start stage ends until the user operates the directional indicator lever to make an instruction for stopping blinking of the direction indicator. The scene end stage is for a period of one cycle (for example, one second) after the user operates the directional indicator lever to make an instruction for stopping blinking of the directional indicator.

At the scene start stage, the lighting pattern of the map data (1) is used. At the scene halfway stage, the lighting pattern of the map data (2) is used. At the scene end stage, the lighting pattern of map data (3) is used. The lighting pattern of the map data (1) is used only once. The number of use of the lighting pattern of the map data (2) is not defined. The lighting pattern of the map data (3) is used only once.

In the following, an operation example of the lighting pattern setting unit 1111 when the lighting pattern information of FIG. 19 is used is described.

The lighting pattern setting unit 1111 acquires instruction information transmitted from the light distribution control device 1, and acquires lighting patterns of the control-target light source from the first storage unit 1150. When acquiring the lighting patterns illustrated in (a) of FIG. 19, the lighting pattern setting unit 1111 reads the map data (1), which is the map data at the scene start stage. Then, the lighting pattern setting unit 1111 determines a luminance value by following the map data (1).

The lighting pattern setting unit 1111 determines a luminance value by using the map data (1) as many as the number of times specified by the lighting pattern information.

Next, the lighting pattern setting unit 1111, reads the map data (2), which is the map data at the scene halfway stage. Then, the lighting pattern setting unit 1111 determines a luminance value by following the map data (2).

The lighting pattern setting unit 1111 determines a luminance value by using the map data (2) as many as the number of times specified by the lighting pattern information.

Next, the lighting pattern setting unit 1111, reads the map data (3), which is the map data at the scene end stage. Then, the lighting pattern setting unit 1111 determines a luminance value by following the map data (3).

The lighting pattern setting unit 1111 determines a luminance value by using the map data (3) as many as the number of times specified by the lighting pattern information.

Note that when "infinity" is set as the number of times for the map data at the scene halfway stage, the lighting pattern setting unit 1111 reads the map data (3), which is the map data at the scene end stage, when receiving, from the light distribution control device 1, instruction information for making a notification of stopping blinking of the directional indicator. Also, the lighting pattern setting unit 1111 may read the map data (3) when receiving, from the light distribution control device 1, instruction information for making a notification of a difference scene.

In this manner, by defining a lighting pattern for each stage in the scene, diverse lighting patterns can be implemented. Also, an abrupt change in switching the lighting pattern at the time of scene transition can be inhibited, and a sense of incongruity of a passenger of the vehicle, a passenger of a forward vehicle, a pedestrian, or the like can be reduced.

Note that the above-described luminance value determination method described by using FIG. 19 is performed by following a flow illustrated in FIG. 35, FIG. 36, FIG. 37, and FIG. 38.

Figure 35:
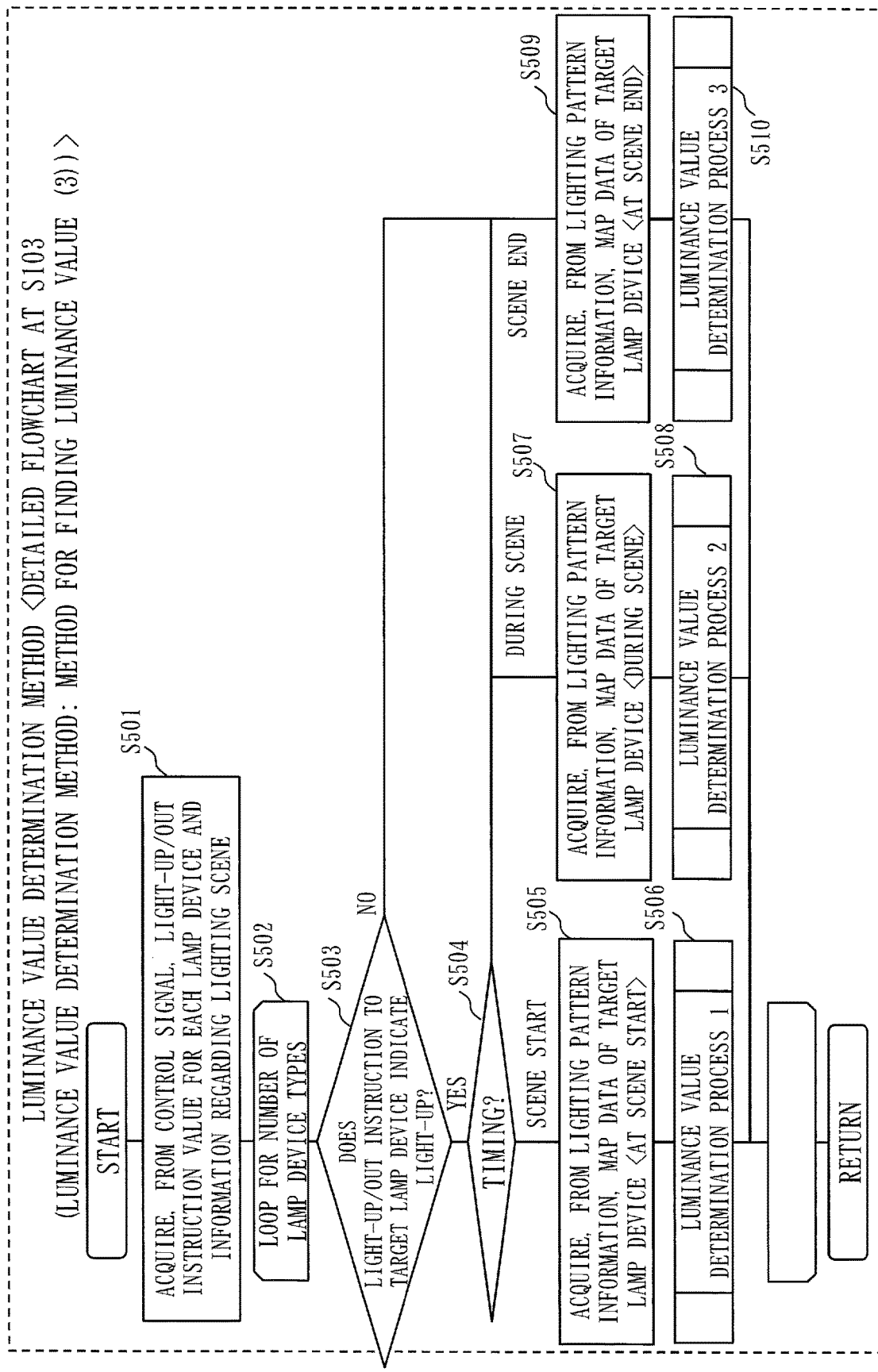
FIG. 35 is a flowchart illustrating the luminance value determination method according to Embodiment 1.

The lighting pattern setting unit 1111 acquires, from the vehicle communication unit 1120, instruction information transmitted from the light distribution control device 1 and, based on the instruction information, acquires a lighting pattern of the control-target light source from the lighting pattern information retained in the first storage unit 1150 (step S501 of FIG. 35). Next, the lighting pattern setting unit 1111 determines a lighting value for each lamp device as a control target (step S502 of FIG. 35).

Based on the instruction information for each target lamp device, the lighting pattern setting unit 1111 judges whether the instruction to the target lamp device is light-up or light-out (step S503 of FIG. 35). When the instruction to the target lamp device is light-up, the lighting pattern setting unit 1111 judges a lighting timing (step S504 of FIG. 35). In luminance value determination, at a first control timing when the target lamp device is notified of a lighting instruction by the light distribution control device 1, the lighting pattern setting unit 1111 judges as scene start, and reads the map data at the scene start stage (step S505 of FIG. 35). When using the map data as many as the number of times set by the lighting pattern information at the scene start stage to set a luminance value, the lighting pattern setting unit 1111 judges as during scene, and reads the map data at the scene halfway stage (step S507 of FIG. 35). When using the map data as many as the number of times set by the lighting pattern information at the scene halfway stage to set a luminance value, the lighting pattern setting unit 1111 judges as scene end, and reads the map data at the scene end stage (step S509 of FIG. 35). Also, when receiving instruction information for a different scene from the light distribution control device 1 while executing the map data at the scene start stage and at the scene halfway stage, the lighting pattern setting unit 1111 also judges as scene end. On the other hand, when the instruction to the target lamp device is light-out, the lighting pattern setting unit 1111 judges as scene end, and reads the map data at the scene end stage.

The lighting pattern setting unit 1111 determines a luminance value for each control cycle (for example, 10 ms). In the map data for setting a time transition of the luminance value, luminance values per unit time are recorded for a predetermined time. In luminance value determination, a first control timing when a notification of a lighting instruction is provided to the target lamp device is assumed to be 0 ms. In the following, a luminance value setting method at scene start, during scene, and scene end is described.

<Scene Start>

Figure 36:
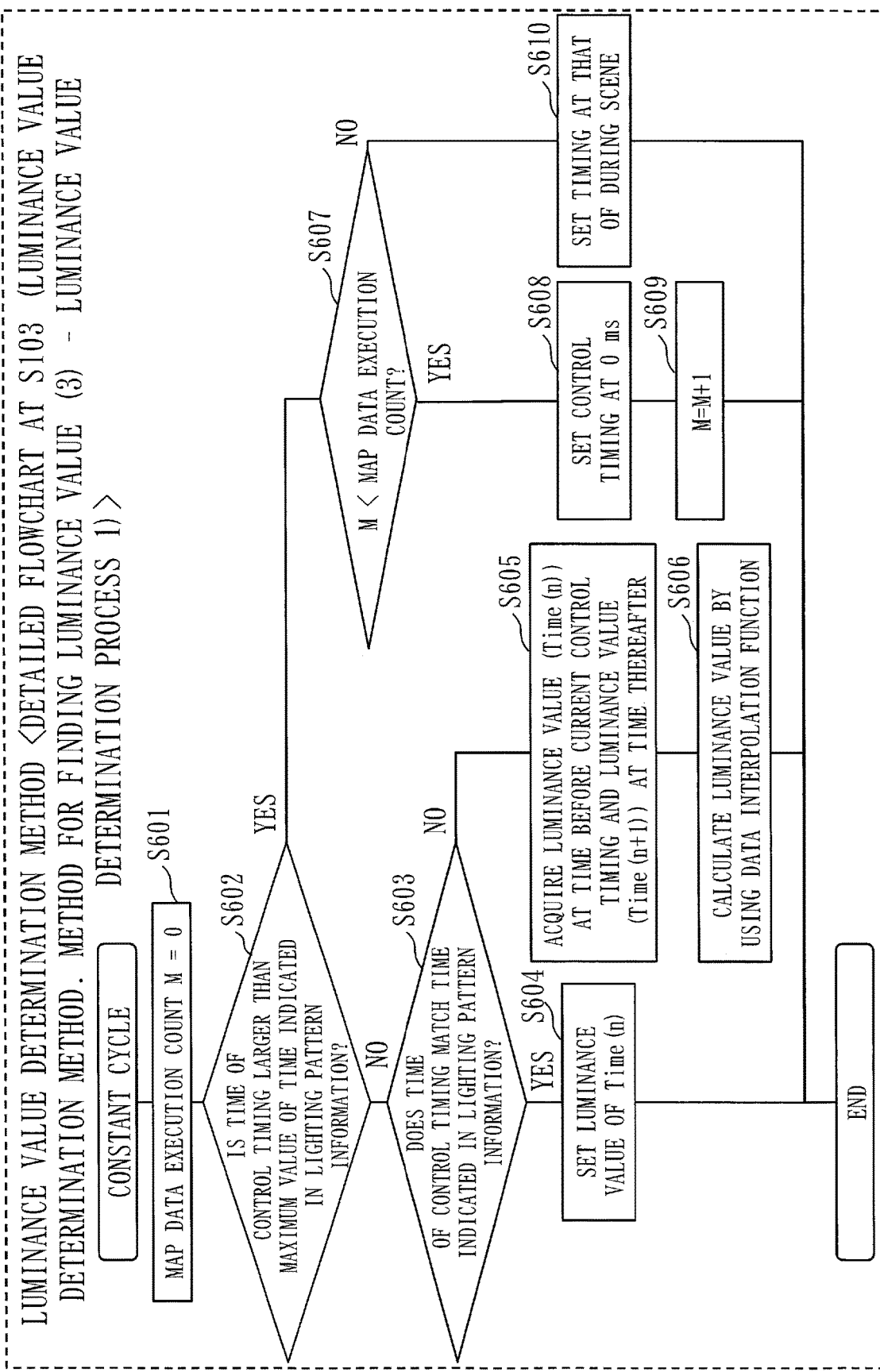
FIG. 36 is a flowchart illustrating the luminance value determination method according to Embodiment 1.

The lighting pattern setting unit 1111 initially sets a map data execution count at 0 (step S601 of FIG. 36). The lighting pattern setting unit 1111 judges whether the time of the current control timing is larger than the maximum value of the time indicated in the lighting pattern information (step S602 of FIG. 36). When the time of the current control timing is smaller than the maximum value of the time indicated in the lighting pattern information, the lighting pattern setting unit 1111 judges whether the time of the current control timing matches the time indicated in the lighting pattern information (step S603 of FIG. 36). When the time of the current control timing matches the time indicated in the lighting pattern information, the lighting pattern setting unit 1111 selects the luminance value described in the lighting pattern information (step S604 of FIG. 36). On the other hand, when the current control timing does not match the time indicated in the lighting pattern information, the lighting pattern setting unit 1111 acquires a luminance value at a nearest time (Time(n)) before the time of the current control timing among times written in the lighting pattern information and a luminance value at a nearest time (Time(n+1)) after the time of the current control timing among times written in the lighting pattern information (step S605 of FIG. 36). From the acquired luminance values, by using the data interpolation function ($L(t)=kt^{\alpha}$), the lighting pattern setting unit 1111 determines a luminance value at the current control timing (step S606 of FIG. 36). Also, when the time of the current control timing is larger than the maximum value of the time indicated in the lighting pattern information, the lighting pattern setting unit 1111 judges whether map data execution has been performed the number of times set in the lighting pattern information at the scene start stage (step S607 of FIG. 36). If map data execution has not been performed the number of times set in the lighting pattern information at the scene start stage, the lighting pattern setting unit 1111 returns the control timing to 0 ms (step S608 of FIG. 36), and increments the map data execution count (step S609 of FIG. 36). On the other hand, if map data execution has been performed the number of times set in the lighting pattern information at the scene start stage, the lighting pattern setting unit 1111 changes the timing to that of during scene (step S610 of FIG. 36).

<During Scene>

Figure 37:
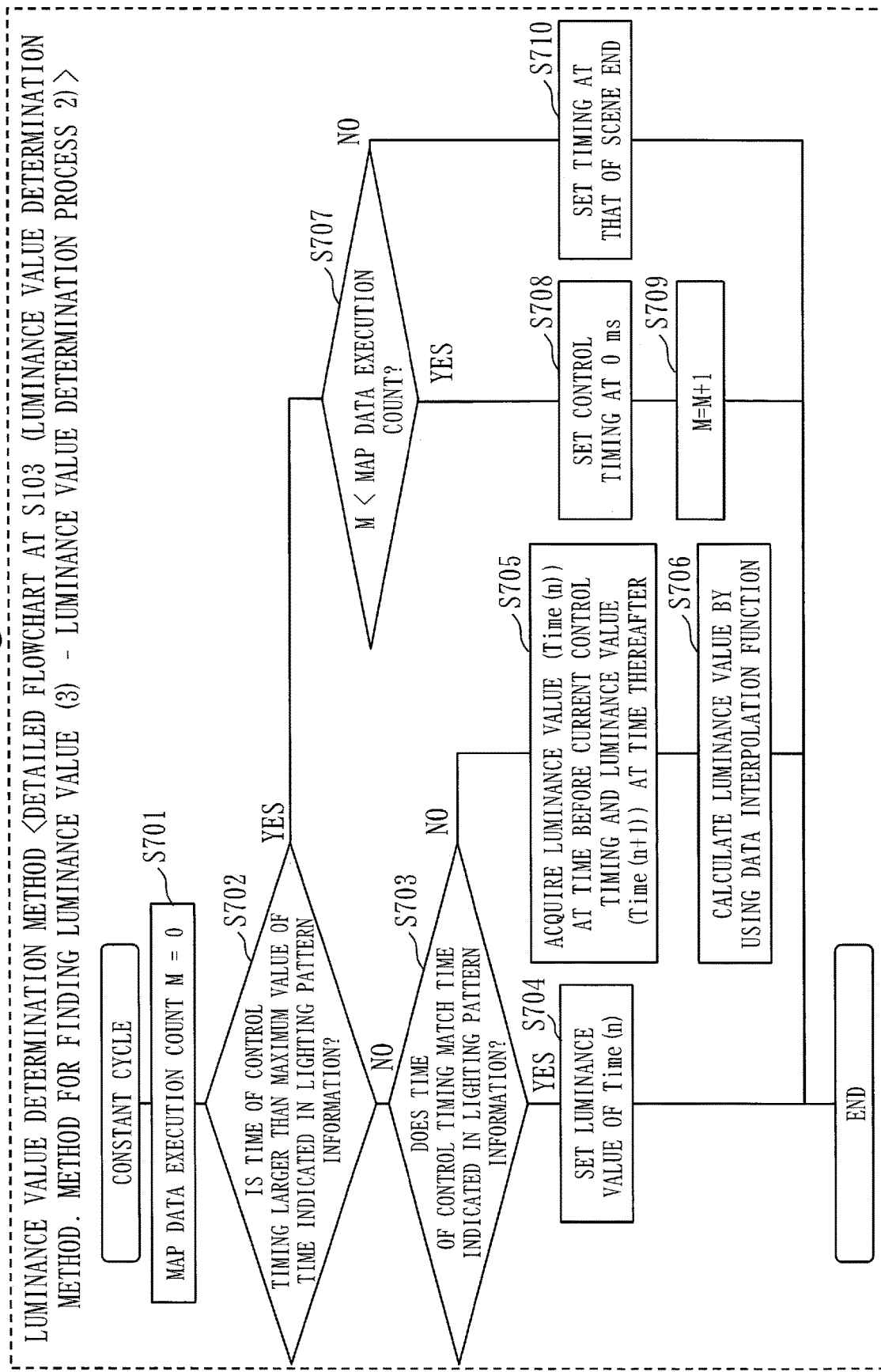
FIG. 37 is a flowchart illustrating the luminance value determination method according to Embodiment 1.

The lighting pattern setting unit 1111 initially sets a map data execution count at 0 (step S701 of FIG. 37). The lighting pattern setting unit 1111 judges whether the time of the current control timing is larger than the maximum value of the time indicated in the lighting pattern information (step S702 of FIG. 37). When the time of the current control timing is smaller than the maximum value of the time indicated in the lighting pattern information, the lighting pattern setting unit 1111 judges whether the time of the current control timing matches the time indicated in the lighting pattern information (step S703 of FIG. 37). When the time of the current control timing matches the time indicated in the lighting pattern information, the lighting pattern setting unit 1111 selects the luminance value described in the lighting pattern information (step S704 of FIG. 37). On the other hand, when the current control timing does not match the time indicated in the lighting pattern information, the lighting pattern setting unit 1111 acquires a luminance value at a nearest time (Time(n)) before the time of the current control timing among times written in the lighting pattern information and a luminance value at a nearest time (Time(n+1)) after the time of the current control timing among times written in the lighting pattern information (step S705 of FIG. 37). From the acquired luminance values, by using the data interpolation function ($L(t)=kt^{\alpha}$), the lighting pattern setting unit 1111 determines a luminance value at the current control timing (step S706 of FIG. 37). Also, when the time of the current control timing is larger than the maximum value of the time indicated in the lighting pattern information, the lighting pattern setting unit 1111 judges whether map data execution has been performed the number of times set in the lighting pattern information at the scene halfway stage (step S707 of FIG. 37). If map data execution has not been performed the number of times set in the lighting pattern information at the scene halfway stage, the lighting pattern setting unit 1111 returns the control timing to 0 ms (step S708 of FIG. 37), and increments the map data execution count (step S709 of FIG. 37). On the other hand, if map data execution has been performed the number of times set in the lighting pattern information at the scene halfway stage, the lighting pattern setting unit 1111 changes the timing to that of scene end (step S710 of FIG. 37).

<Scene End>

The lighting pattern setting unit 1111 initially sets a map data execution count at 0 (step S801 of FIG. 38). The lighting pattern setting unit 1111 judges whether the time of the current control timing is larger than the maximum value of the time indicated in the lighting pattern information (step S802 of FIG. 38). When the time of the current control timing is smaller than the maximum value of the time indicated in the lighting pattern information, the lighting pattern setting unit 1111 judges whether the time of the current control timing matches the time indicated in the lighting pattern information (step S803 of FIG. 38). When the time of the current control timing matches the time indicated in the lighting pattern information, the lighting pattern setting unit 1111 selects the luminance value described in the lighting pattern information (step S804 of FIG. 38). On the other hand, when the current control timing does not match the time indicated in the lighting pattern information, the lighting pattern setting unit 1111 acquires a luminance value at a nearest time (Time(n)) before the time of the current control timing among times written in the lighting pattern information and a luminance value at a nearest time (Time(n+1)) after the time of the current control timing among times written in the lighting pattern information (step S805 of FIG. 38). From the acquired luminance values, by using the data interpolation function ($L(t)=kt^{\alpha}$), the lighting pattern setting unit 1111 determines a luminance value at the current control timing (step S806 of FIG. 38). Also, when the time of the current control timing is larger than the maximum value of the time indicated in the lighting pattern information, the lighting pattern setting unit 1111 judges whether map data execution has been performed the number of times set in the lighting pattern information at the scene halfway stage (step S807 of FIG. 38). If map data execution has not been performed the number of times set in the lighting pattern information at the scene halfway stage, the lighting pattern setting unit 1111 returns the control timing to 0 ms (step S808 of FIG. 38), and increments the map data execution count (step S809 of FIG. 38). On the other hand, if map data execution has been performed the number of times set in the lighting pattern information at the scene halfway stage, the lighting pattern setting unit 1111 sets the luminance value of the target lamp device at 0% (step S810 of FIG. 38).

<Description of Operation (5) Setting of Definition Information>

In the following, the operation of setting definition information is described.

Figure 20:
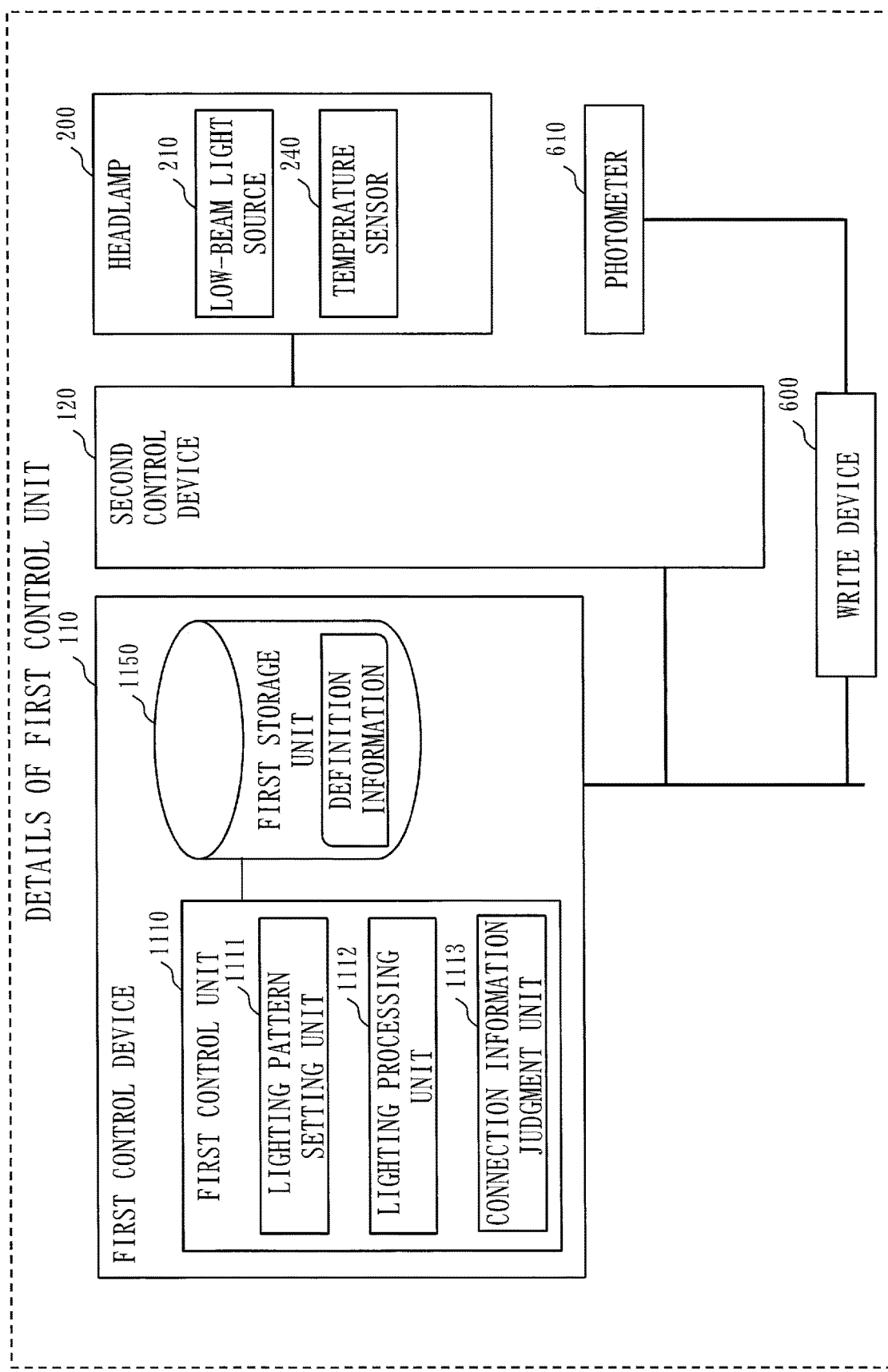
FIG. 20 illustrates details of the first control unit according to Embodiment 1.
Figure 21:
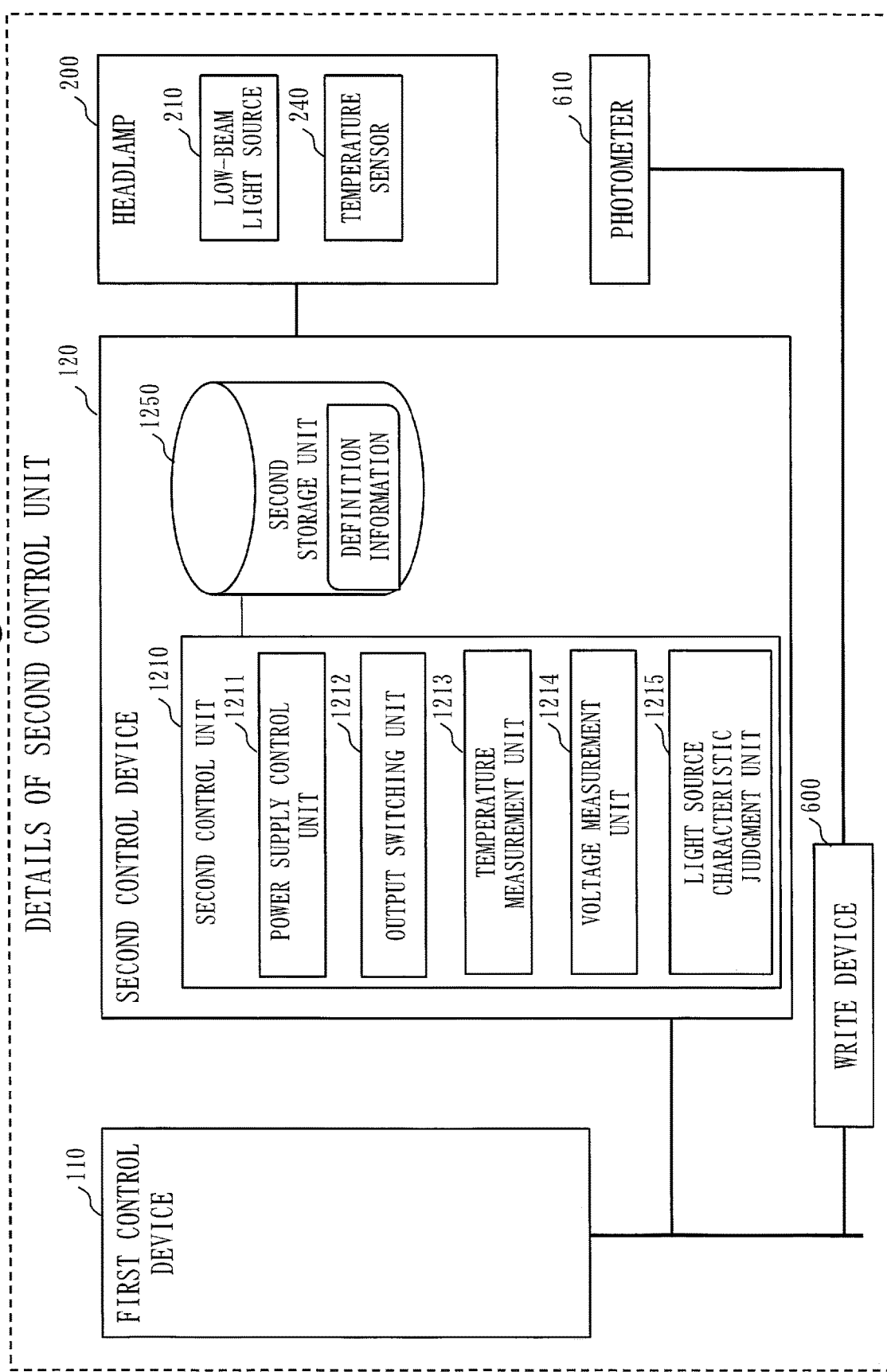
FIG. 21 illustrates details of the second control unit according to Embodiment 1.

FIG. 20 and FIG. 21 illustrate a flow of operation of setting definition information.

FIG. 22 illustrates definition information for use in setting the definition information (light source control information). The definition information illustrated in FIG. 22 is referred to as definition information (light source characteristic information). The definition information (light source characteristic information) is also simply represented as light source characteristic information.

Setting of the definition information (light source control information) is performed in a work of assembling the headlamp 200 and the headlamp lighting device 100 before a release of the vehicle.

In the structure illustrated in FIG. 20, in the first control unit 1110, the lighting pattern setting unit 1111, the lighting processing unit 1112, and a connection information judgment unit 1113 are included.

The lighting pattern setting unit 1111 and the lighting processing unit 1112 are the same as those illustrated in FIG. 7.

In the structure illustrated in FIG. 21, in the second control unit 1210, the power supply control unit 1211, the output switching unit 1212, a temperature measurement unit 1213, a voltage measurement unit 1214, and a light source characteristic judgment unit 1215 are included.

The power supply control unit 1211 and the output switching unit 1212 are the same as those illustrated in FIG. 7.

<Setting of Definition Information (Light Source Control Information)>

The light sources are ranked due to individual differences among elements of the light sources (for example, LED elements). When the same current value is supplied to light sources in different ranks, each light source can have a different luminance.

In the following, an example of setting an appropriate supply current value for each rank is described.

The second storage unit 1250 of the second control device 120 retains light source characteristic information illustrated in FIG. 22. In the light source characteristic information, as illustrated in (a) of FIG. 22, a reference current value for use in discriminating the characteristics of the light sources, and luminosity for each light source rank obtained when the reference current value is let flow, are defined. The luminosity for each light source rank is defined for each peripheral temperature. Also, in the light source characteristic information, as illustrated in (b) of FIG. 22, for each light source type, a light source current value to be supplied when the light source is lit up is defined for each rank. Furthermore, as illustrated in (c) of FIG. 22, for each light source type, a target value of luminosity to be outputted when the light source is lit up is defined. The light source characteristic information illustrated in FIG. 22 is written by the write device 600 in the second storage unit 1250.

The light source characteristic judgment unit 1215 acquires the reference current value for measurement from the light source characteristic information retained in the second storage unit 1250. Then, the light source characteristic judgment unit 1215 notifies the power supply control unit 1211 of the acquired reference current value. The power supply control unit 1211 outputs the notified reference current value to the light source of the headlamp 200.

The output switching unit 1212 controls each light source with the PWM control value with the duty ratio of 100%.

The temperature sensor 240 measures a peripheral temperature of each light source when the reference current value is let flow through each light source. Then, the temperature measurement unit 1213 acquires, from the temperature sensor 240, temperature information where the temperature measured on the periphery of each light source (measured temperature) is presented, and stores the acquired temperature information in the second storage unit 1250.

The photometer 610 measures a luminosity of each light source when the reference current value is let flow. The write device 600 acquires, from the photometer 610, the value of the measured luminosity (measurement luminosity) of each light source, and transmits luminosity information where the value of the acquired measurement luminosity is presented to the second control device 120.

In the second control device 120, the light source characteristic judgment unit 1215 acquires the luminosity information transmitted from the write device 600. The light source characteristic judgment unit 1215 reads the temperature information from the second storage unit 1250. Also, the light source characteristic judgment unit 1215 reads the light source characteristic information from the second storage unit 1250. Furthermore, the light source characteristic judgment unit 1215 compares the reference current value outputted to the light source and the temperature and luminosity obtained when the reference current value is outputted with the temperature and luminosity set in the light source characteristic information, and determines a rank value of the light source of the headlamp 200 connected to the second control device 120. For example, in a case where the temperature is 25 degrees and the luminosity is 800 mcd when a reference current value of 20 mA is outputted to a light source type 1 illustrated in (a) of FIG. 22, the light source characteristic judgment unit 1215 judges the light source rank as rank A. When the acquired temperature and luminosity are not identical to the values set in the light source characteristic information, the light source characteristic judgment unit 1215 selects the nearest values in the light source characteristic information. For example, the light source characteristic judgment unit 1215 changes the reference current value three times or so, and the photometer 610 measures a luminosity every time. Then, the light source characteristic judgment unit 1215 analyzes a relation between the current value and the luminosity, and selects a rank value with the closest characteristic of changes of the luminosity with respect to the current value. Subsequently, based on the determined rank value, the light source characteristic judgment unit 1215 refers to the light source current value for each light source type illustrated in (b) of FIG. 22 to determine a supply current value for the light source of the headlamp 200 connected to the second control device 120.

The light source characteristic judgment unit 1215 notifies the power supply control unit 1211 of the determined supply current value. Also, the light source characteristic judgment unit 1215 lights up the light source of the headlamp 200, and receives the luminosity information from the write device 600. Then, the light source characteristic judgment unit 1215 judges a difference between a target luminosity ((c) of FIG. 22) written in the definition information (light source characteristic information) of the second storage unit 1250 and the measurement luminosity indicated in the acquired luminosity information. When the difference between the target luminosity and the measurement luminosity indicated in the acquired luminosity information is large, the light source characteristic judgment unit 1215 changes the current value so that the luminosity measured by the photometer 610 becomes closer to the target luminosity in an allowable current value range ((c) of FIG. 22) written in the definition information (light source characteristic information).

The light source characteristic judgment unit 1215 notifies the write device 600 of a current value with which a luminosity close to the target luminosity can be acquired.

The write device 600 rewrites the supply current value of the light source control information of FIG. 10 with the current value notified from the light source characteristic judgment unit 1215.

Note that the method of finding a rank value has been described above. In place of this, without finding a rank value, the supply current value to be supplied to the light source of the headlamp 200 may be determined based on the target luminosity and the allowable current value of the light source of the headlamp 200.

Also in the above, the example of using the write device 600 has been described. In place of this, without using the write device 600, the photometer 610 may be attached to the second control device 120, and the second control device 120 may directly acquire the luminosity information from the photometer 610.

In this manner, by setting a current value to be let flow through the light source attached to the headlamp, the definition information can be finely set in accordance with the characteristics of the light source. This can simplify the work of selecting a light source attached to the headlamp. Also, the luminosity of the light source attached to the headlamp can be made uniform.

<Setting of Definition Information (Connection Information)>

The connection information judgment unit 1113 in the first control device 110 requests all second control devices 120 to transmit the light source control information (FIG. 10) at the time of activation of the power supply of the microcomputer 1100.

When receiving the request for transmitting the light source control information, the light source characteristic judgment unit 1215 in the second control device 120 transmits the light source control information retained in the second storage unit 1250 to the first control device 110. Note that in the second storage unit 1250 of the second control device 120, numbers for distinguishing the respective second control devices 120 are set in advance. The light source characteristic judgment unit 1215 transmits the relevant number together with the light source control information to the first control device 110.

The connection information judgment unit 1113 receives a response from the second control device 120. Then, the connection information judgment unit 1113 transmits the light source control information and the number of the second control device 120 being responses from the second control device 120, to the write device 600.

The write device 600 rewrites the definition information (connection information) (FIG. 8) retained in the first storage unit 1150 in the first control device 110 based on the received light source control information and number of the second control device 120.

In the above, the example has been described in which the write device 600 rewrites the definition information (connection information). Without using the write device 600, the connection information judgment unit 1113 in the first control device 110 may rewrite the definition information (connection information) in the first storage unit 1150.

In this manner, with the above-described procedure, the information of the second control device 120 connected to the first control device 110 can be automatically set or updated. This can facilitate connection of the headlamp 200 and the second control device 120 to the first control device 110.

<Setting of Definition Information (Connection Information)>

In the second storage unit 1250 of the second control device 120, definition information (lamp device characteristic information) is retained. In the following, the definition information (lamp device characteristic information) is also simply referred to as lamp device characteristic information.

In the definition information (lamp device characteristic information), a relation is presented between the current value and the voltage value of the light source for each lamp device connected to the second control device 120.

FIG. 23 illustrates an example of the definition information (lamp device characteristic information).

While a relation between the current value and the voltage value of the low beam and those of the position lamp are presented in FIG. 23, a relation between the current value and the voltage value of a lamp device of another type is also managed in the definition information (lamp device characteristic information).

The lamp device characteristic information is written by the write device 600 in the second storage unit 1250.

The light source characteristic judgment unit 1215 acquires a reference current value for measurement from the lamp device characteristic information retained in the second storage unit 1250. The reference current value is a current value written in the lamp device characteristic information. In the example of FIG. 23, 100 mA, 200 mA, and 300 mA are reference current values. The light source characteristic judgment unit 1215 acquires any of these 100 mA, 200 mA, and 300 mA. Then, the light source characteristic judgment unit 1215 notifies the power supply control unit 1211 of the acquired reference current value.

The power supply control unit 1211 outputs the notified reference current value to the light source of the headlamp 200.

The output switching unit 1212 controls each light source with the PWM control value with the duty ratio of 100%.

The voltage measurement unit 1214 measures a voltage value when the reference current value is let flow. Then, the voltage measurement unit 1214 stores, in the second storage unit 1250, voltage information in which the measured voltage value is presented.

The light source characteristic judgment unit 1215 reads the voltage information from the second storage unit 1250. Then, the light source characteristic judgment unit 1215 collates the voltage value indicated in the voltage information and the reference current value against the voltage value and the current value indicated in the lamp device characteristic information to judge a type of lamp device to which the light source connected to the second control device 120 belongs.

For example, the light source characteristic judgment unit 1215 changes the reference current value five times or so, and the voltage measurement unit 1214 measures a voltage value every time. Then, the light source characteristic judgment unit 1215 analyzes a relation between the current value and the voltage value, and selects a type of lamp device with the closest characteristic of changes of the voltage value with respect to the current value.

The light source characteristic judgment unit 1215 notifies the write device 600 of the determined lamp device type.

Based on the notified lamp device type, the write device 600 rewrites the definition information (connection information) (FIG. 8) in the first storage unit 1150 of the first control device 110.

In this manner, by specifying the type of lamp device connected to the second control device 120, the definition information (connection information) can be automatically set or updated only by connecting the headlamp to the second control device 120. Thus, development of the headlamp control system can be made efficient.

*Description of Effects of Embodiment*

As described above, according to the present embodiment, by changing the definition information in accordance with the specification of the lamp device arranged on the vehicle, the headlamp lighting device 100 can control various lamp devices by absorbing specification differences among the lamp devices.

That is, according to the present embodiment, only by resetting the definition information in accordance with the number of light sources attached to the headlamp or their characteristics, it is possible to make the headlamp lighting device 100 support various vehicles. Also, according to the present embodiment, only by attaching a component required for the headlamp in accordance with the number of light sources of the headlamp, it is possible to make the headlamp lighting device 100 support various vehicles. Furthermore, according to the present embodiment, by finely setting the definition information in accordance with the characteristics of the light source, the work of selecting a light source can be simplified. Also, according to the present embodiment, the luminosity of the light source can be made uniform.

Embodiment 2

In the present embodiment, differences from Embodiment 1 are mainly described.

Note that matters not described in the following are similar to those of Embodiment 1.

Figure 24:
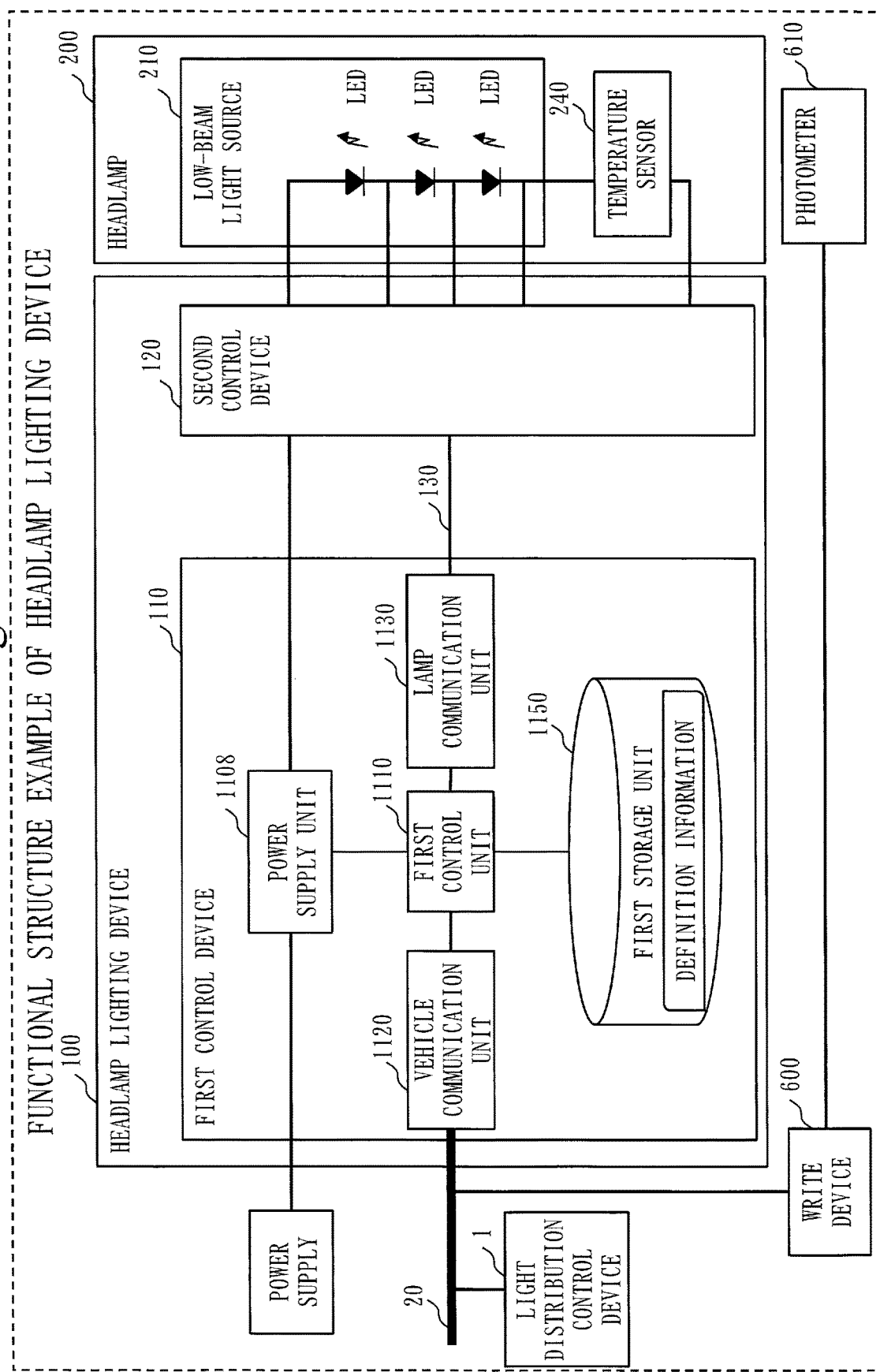
FIG. 24 illustrates a functional structure example of a headlamp lighting device according to Embodiment 2.
Figure 25:
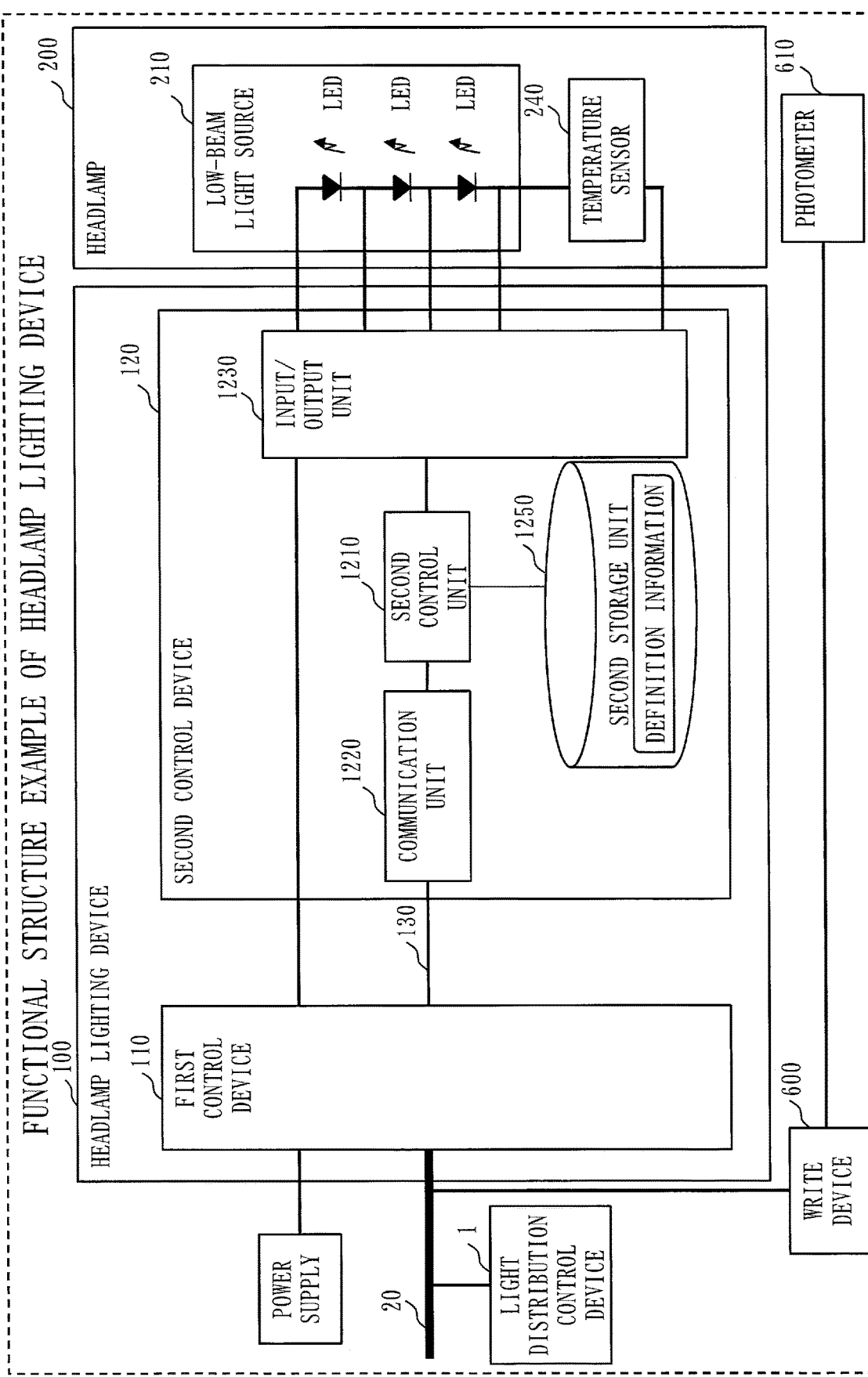
FIG. 25 illustrates a functional structure example of the headlamp lighting device according to Embodiment 2.

*Description of Structure* FIG. 24 and FIG. 25 illustrate a functional structure example of a headlamp lighting device 100 according to the present embodiment.

FIG. 24 mainly illustrates a functional structure example of a first control device 110, and FIG. 25 mainly illustrates a functional structure example of a second control device 120.

Note that while only one second control device 120 is illustrated in FIG. 24 and FIG. 25 by reason of drawing creation, it is assumed that, as illustrated in FIG. 2, three second control devices 120 are arranged on the headlamp lighting device 100. All second control devices 120 have the functional structure illustrated in FIG. 25. Also, the first control device 110 is connected to all of the three second control devices 120. Note that, as described above, the number of second control devices 120 arranged on the headlamp lighting device 100 is not limited to three.

In FIG. 24, compared with FIG. 5, a power supply unit 1108 is added to the first control device 110. Also in FIG. 24, the power supply and the second control device 120 are connected via the first control device 110. The structure illustrated in FIG. 24 is identical to the structure illustrated in FIG. 5 except that the power supply unit 1108 is added to the first control device 110 and the power supply and the second control device 120 are connected via the first control device 110.

The structure illustrated in FIG. 25 is identical to the structure illustrated in FIG. 6 except that the power supply and the second control device 120 are connected via the first control device 110.

\*\*\*Description of Operation\*\*\*

Next, the operation of the headlamp lighting device 100 according to the present embodiment is described.

Figure 26:
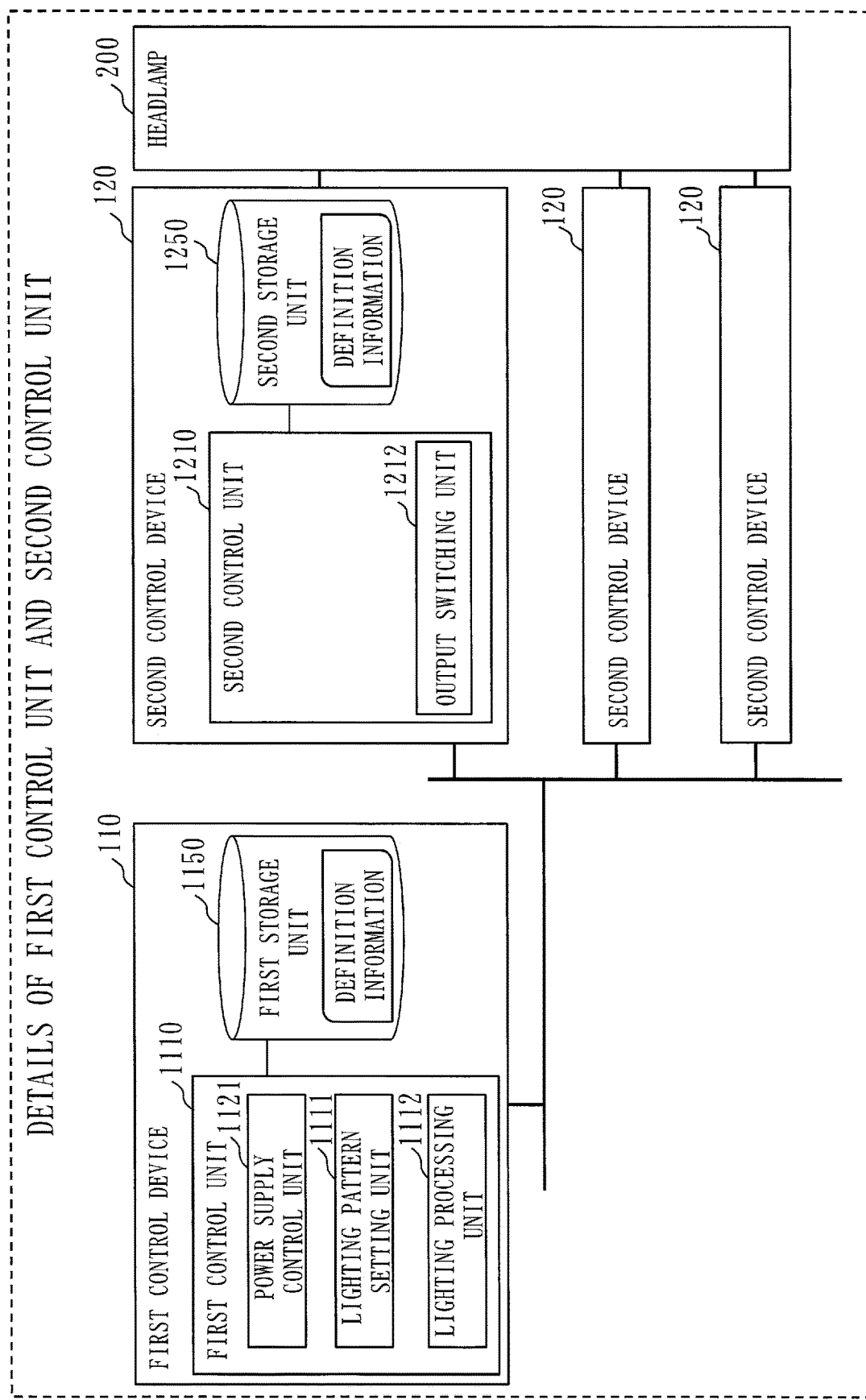
FIG. 26 illustrates details of a first control unit and a second control unit according to Embodiment 2.

FIG. 26 illustrates a flow of the headlamp lighting operation.

In FIG. 26, compared with FIG. 7, a power supply control unit 1121 is added to the first control unit 1110. On the other hand, in the second control unit 1210, the power supply control unit 1211 is omitted.

FIG. 27 illustrates an example of definition information (connection information) retained in the first storage unit 1150 of the first control device 110. In the definition information (connection information) of FIG. 27, compared with the definition information (connection information) of FIG. 8, an item of a supply current value is added. In the definition information (connection information) of FIG. 27, items other than the supply current value are identical to those illustrated in FIG. 8. The definition information (connection information) of FIG. 27 is also simply referred to connection information.

FIG. 28 illustrates definition information (lighting pattern information) retained by the first storage unit 1150. The definition information (lighting pattern information) of FIG. 28 is identical to the definition information (lighting pattern information) of FIG. 9. The definition information (lighting pattern information) of FIG. 28 is also simply referred to as lighting pattern information.

FIG. 29 illustrates definition information (light source control information) retained in the second storage unit 1250. While supply current values are defined in the definition information (light source control information) of FIG. 10, duty ratios are defined in the definition information (light source control information) of FIG. 29. The definition information (light source control information) of FIG. 29 is also simply referred to as light source control information.

The operation of the lighting pattern setting unit 1111 according to the present embodiment is identical to the operation of the lighting pattern setting unit 1111 according to Embodiment 1.

That is, the lighting pattern setting unit 1111 acquires instruction information transmitted from the light distribution control device 1.

Then, based on the instruction information, the lighting pattern setting unit 1111 acquires a lighting pattern of the control-target light source from the lighting pattern information retained in the first storage unit 1150.

Furthermore, the lighting pattern setting unit 1111 determines a luminance value of the control-target light source based on the lighting pattern.

Then, the lighting pattern setting unit 1111 notifies the lighting processing unit 1112 of the lamp device as a control target, the control-target light source, and the luminance value.

The operation of the lighting processing unit 1112 according to the present embodiment is also basically identical to that of the lighting processing unit 1112 according to Embodiment 1.

That is, the lighting processing unit 1112 acquires, from the connection information retained in the first storage unit 1150, the number of the second control device 120 connected to the lamp device notified from the lighting pattern setting unit 1111.

Then, the lighting processing unit 1112 outputs, to the relevant second control device 120, a control signal for making a notification of the control-target light source and the luminance value notified from the lighting pattern setting unit 1111.

Note in the present embodiment that the lighting processing unit 1112 acquires, from the connection information, a supply current value corresponding to the lamp device notified from the lighting pattern setting unit 1111. For example, when the lamp device notified from the lighting pattern setting unit 1111 is "low beam", the lighting processing unit 1112 acquires "1000 mA" as the corresponding supply current value. Then, the lighting processing unit 1112 notifies the power supply control unit 1121 of the acquired supply current value.

The power supply control unit 1121 controls the power supply unit 1108 so that the supply current value notified from the lighting processing unit 1112 is outputted to the second control device 120. By the control of the power supply control unit 1121, the supply current value is supplied from the power supply unit 1108 to the second control device 120.

In the present embodiment, the output switching unit 1212 multiplies the duty ratio indicated in the light source control information of FIG. 29 by the luminance value of the control-target light source notified from the first control device 110 to determine a PWM control value for each luminance value. Then, by using the determined PWM control value, the output switching unit 1212 performs switch control to perform luminance control of the control-target light source.

\*\*\*Description of Effects of Embodiment\*\*\*

In the above, also according to the present embodiment, by changing the definition information in accordance with the specification of the lamp device arranged on the vehicle, the headlamp lighting device 100 can control various lamp devices by absorbing specification differences among the lamp devices.

That is, also according to the present embodiment, only by resetting the definition information in accordance with the number of light sources attached to the headlamp or their characteristics, it is possible to make the headlamp lighting device 100 support various vehicles. And, also according to the present embodiment, only by attaching a component required for the headlamp in accordance with the number of light sources of the headlamp, it is possible to make the headlamp lighting device 100 support various vehicles. Furthermore, also according to the present embodiment, by finely setting the definition information in accordance with the characteristics of the light source, the work of selecting a light source can be simplified. And, also according to the present embodiment, the luminosity of the light source can be made uniform.

Note that also in the structure described in the present embodiment, it is possible to set definition information and switch the lighting pattern described in Embodiment 1.

While the embodiments of the present invention have been described above, these two embodiments may be implemented as combined.

Alternatively, one of these two embodiments may be partially implemented.

Still alternatively, these two embodiments may be implemented as partially combined.

Note that the present invention is not limited to these embodiments and can be variously changed as required.

*Description of Hardware Structure*

Finally, additional description of the hardware structure of the headlamp lighting device 100 is made.

The processor 1103 and the processor 1203 are each an IC (Integrated Circuit) for performing processing.

The processor 1103 and the processor 1203 are each a CPU (Central Processing Unit), DSP (Digital Signal Processor), or the like.

An OS (Operating System) is also stored in the ROM 1101 or the non-volatile memory 1105.

And, at least part of the OS is executed by the processor 1103.

While executing at least part of the OS, the processor 1103 executes programs for implementing the functions of the first control unit 1110, the vehicle communication unit 1120, and the lamp communication unit 1130.

With the processor 1103 executing the OS, task management, memory management, file management, communication control, and so forth are performed.

Also, at least any of information, data, signal values, and variable values indicating the results of the processes of the first control unit 1110, the vehicle communication unit 1120, and the lamp communication unit 1130 are stored in at least any of the RAM 1102, the non-volatile memory 1105, and a register and cache memory in the processor 1103.

An OS is also stored in the ROM 1201 or the non-volatile memory 1205.

And, at least part of the OS is executed by the processor 1203.

While executing at least part of the OS, the processor 1203 executes programs for implementing the functions of the second control unit 1210, the communication unit 1220, and the input/output unit 1230.

With the processor 1203 executing the OS, task management, memory management, file management, communication control, and so forth are performed.

Also, at least any of information, data, signal values, and variable values indicating the results of the processes of the second control unit 1210, the communication unit 1220, and the input/output unit 1230 are stored in at least any of the RAM 1202, the non-volatile memory 1205, and a register and cache memory in the processor 1203.

The programs for implementing the functions of the first control unit 1110, the vehicle communication unit 1120, the lamp communication unit 1130, the second control unit 1210, the communication unit 1220, and the input/output unit 1230 may be stored in a portable storage medium such as a magnetic disc, flexible disc, optical disc, compact disc, Blu-ray (a registered trademark) disc, or DVD.

Also, the "units" of the first control unit 1110, the vehicle communication unit 1120, the lamp communication unit 1130, the second control unit 1210, the communication unit 1220, and the input/output unit 1230 may be read as "circuits", "steps", "procedures", or "processes".

Also, the headlamp lighting device 100 may be implemented by an electronic circuit such as a logic IC, GA (Gate Array), ASIC (Application Specific Integrated Circuit), or FPGA (Field-Programmable Gate Array).

In this case, the first control unit 1110, the vehicle communication unit 1120, the lamp communication unit 1130, the second control unit 1210, the communication unit 1220, and the input/output unit 1230 are each implemented as part of the electronic circuit.

Note that the processor and the above-described electronic circuit are also collectively referred to as processing circuitry.

REFERENCE SIGNS LIST

1: light distribution control device; 20: network; 100: headlamp lighting device; 110: first control device; 120: second control device; 130: network; 200: headlamp; 210: low-beam light source; 220: ADB (1) light source; 230: ADB (2) light source; 240: temperature sensor; 300: headlamp lighting device; 400: headlamp; 500: on-vehicle camera; 600: write device; 610: photometer; 1100: microcomputer; 1101: ROM; 1102: RAM; 1103: processor; 1104: program; 1105: non-volatile memory; 1106: vehicle communication interface; 1107: lamp communication interface; 1108: power supply unit; 1110: first control unit; 1111: lighting pattern setting unit; 1112: lighting processing unit; 1113: connection information judgment unit; 1120: vehicle communication unit; 1121: power supply control unit; 1130: lamp communication unit; 1150: first storage unit; 1201: ROM; 1202: RAM; 1203: processor; 1204: program; 1205: non-volatile memory; 1206: communication interface; 1207: input/output interface; 1210: second control unit; 1211: power supply control unit; 1212: output switching unit; 1213: temperature measurement unit; 1214: voltage measurement unit; 1215: light source characteristic judgment unit; 1220: communication unit; 1230: input/output unit; 1250: second storage unit.

The invention claimed is:

1. A lighting control device to be mounted on a vehicle, the lighting control device comprising:
a first control device and a plurality of second control devices each of which is connected to at least one of a plurality of lamp devices arranged on the vehicle, wherein
the first control device
stores connection information indicating, for each of the plurality of second control devices, a corresponding lamp device connected to each of the plurality of second control devices and for each corresponding lamp device, a corresponding light source which illuminates the corresponding lamp device, and
selects, by referring to the connection information, one of the plurality of second control devices whose corresponding lamp device corresponds to a target lamp device which is a control target and selects the corresponding light source of the selected second control device as a control-target light source, and outputs to the selected second control device, a control signal indicating the control-target light source and information for controlling the control-target light source, and
the selected second control device controls the control-target light source, based on the information indicated by the received control signal.

2. The lighting control device according to claim 1, wherein
the first control device
stores lighting pattern information in which a plurality of situations are presented and in which, for each of the situations, a lamp device as a control target and a lighting pattern are indicated, the lighting pattern being a time transition of a luminance value of a light source configuring the lamp device, selects, by referring to the lighting pattern information, a lamp device corresponding to a current situation as the target lamp device, and acquires a lighting pattern of the corresponding light source indicated as being connected to the target lamp device from the lighting pattern information, and selects, by referring to the connection information, one of the plurality of second control devices whose corresponding lamp device corresponds to the selected target lamp device, selects the corresponding light source of the selected second control device as a control-target light source, and outputs to the selected second control device, a control signal indicating the control-target light source and the lighting pattern of the control-target light source, and the selected second control device controls luminance of the control-target light source, based on the lighting pattern indicated by the received control signal.

3. The lighting control device according to claim 2, wherein
the first control device
stores lighting pattern information in which the time transition of the luminance value of the control-target light source is presented per unit time as the lighting pattern of the control-target light source, and
calculates an interpolation luminance value which interpolates a luminance value per unit time of the acquired lighting pattern, and outputs to the selected second control device, a control signal indicating the interpolation luminance value calculated, and
the selected second control device controls, by using the luminance value per unit time of the lighting pattern indicated by the received control signal and the interpolation luminance value indicated by the received control signal, luminance of the control-target light source.

4. The lighting control device according to claim 2, wherein the first control device stores lighting pattern information in which a lighting pattern and a mask pattern in a first situation are used and a lighting pattern in a second situation different from the first situation is defined.

5. The lighting control device according to claim 2, wherein the first control device stores lighting pattern information in which a lighting pattern in a first situation and a lighting pattern in a second situation different from the first situation are used and a lighting pattern in a third situation different from the first situation and the second situation is defined.

6. The lighting control device according to claim 2, wherein the first control device stores lighting pattern information in which as for a specific situation, a lighting pattern at a start stage of the specific situation, a lighting pattern at a halfway stage of the specific situation, and a lighting pattern at an end stage of the specific situation are presented.

7. The lighting control device according to claim 2, wherein
each of the plurality of second control devices stores, for each of the corresponding light sources of the corresponding lamp devices, light source control information in which a supply current value is presented, and
the selected second control device controls the lighting of the control-target light source by using the lighting pattern indicated by the received control signal and the supply current value of the control-target light source.

8. The lighting control device according to claim 7, wherein
each of the plurality of second control devices determines a supply current value of each of the corresponding light sources based on a measurement luminosity, which is a luminosity of each of the corresponding light sources measured when a predefined reference current value is supplied to each of the corresponding light sources, a peripheral temperature of each of the corresponding light sources, and the reference current value, and
stores light source control information indicating the determined supply current value of each of the corresponding light sources.

9. The lighting control device according to claim 8, wherein each of the plurality of second control devices judges whether the measurement luminosity of each of the corresponding light sources reaches a target luminosity of each of the corresponding light sources and, based on the judgment result, determines the supply current value of each of the corresponding light sources.

10. The lighting control device according to claim 2, wherein each of the plurality of second control devices stores, for each of the corresponding light sources of the corresponding lamp devices, light source control information in which a duty ratio for PWM control is presented, and
the selected second control device controls the lighting of the control-target light source by using the lighting pattern indicated by the received control signal and the duty ratio of the control-target light source.

11. The lighting control device according to claim 1, wherein
each of the plurality of second control devices analyzes, for each of the corresponding lamp devices, a relation between a voltage value measured when a predefined reference current value is supplied to each of the corresponding light sources and the reference current value to judge a type of lamp device, and
the first control device stores connection information indicating the type of each of the corresponding lamp devices judged by each of the plurality of second control device.

12. A lighting control method by a lighting control device to be mounted on a vehicle, including a first control device and a plurality of second control devices each of which is connected to at least one of a plurality of lamp devices arranged on the vehicle, the lighting control method comprising:
by the first control device, storing connection information indicating, for each of the plurality of second control devices, a corresponding lamp device connected to each of the plurality of second control devices and for each of the corresponding lamp devices, a corresponding light source which illuminates the corresponding lamp device,
by the first control device, selecting, by referring to the connection information, one of the plurality of second control devices whose corresponding lamp device corresponds to a target lamp device which is a control target and selecting the corresponding light source of the selected second control device as a control-target light source, and outputting to the selected second control device, a control signal making indicating the control-target light source and information for controlling the control-target light source, and by the selected second control device, controlling the control-target light source, based on the information indicated by the received control signal.

13. A non-transitory computer readable medium storing a lighting control program for a lighting control device to be mounted on a vehicle, including a first control device and a plurality of second control devices each of which is connected to at least one of a plurality of lamp devices arranged on the vehicle, the lighting control program causing the first control device
- to store connection information indicating, for each of the plurality of second control devices, a corresponding lamp device connected to each of the plurality of second control devices and for each of the corresponding lamp devices, a corresponding light source which illuminates the corresponding lamp device, and
- to select, by referring to the connection information, one of the plurality of second control devices whose corresponding lamp device corresponds to a target lamp device which is a control target and to select the corresponding light source of the selected second control device as a control-target light source, and to output to the selected second control device, a control signal indicating the control-target light source and information for controlling the control-target light source, and the selected second control device controls the control-target light source, based on the information indicated by the control signal.

* * * * *